US011978303B2

(12) United States Patent
Phillips et al.

(10) Patent No.: US 11,978,303 B2
(45) Date of Patent: May 7, 2024

(54) INTEGRATED ACTIVE CONTROL SYSTEM FOR MANAGING GAMING DEVICES

(71) Applicant: Aristocrat Technologies, Inc., Las Vegas, NV (US)

(72) Inventors: Gareth Stuart Phillips, Manchester (GB); Kent Reisdorph, Henderson, NV (US); Lattamore D. Osburn, Las Vegas, NV (US); Scott Olive, Brookvale (AU); Gary Frerking, Henderson, NV (US); Jeffrey S. Topham, Las Vegas, NV (US); Michael Dugan, Colorado Springs, CO (US); John Denlay, Las Vegas, NV (US); Christine Judith Denlay, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 61 days.

(21) Appl. No.: 16/449,078

(22) Filed: Jun. 21, 2019

(65) Prior Publication Data

US 2019/0371111 A1 Dec. 5, 2019

Related U.S. Application Data

(60) Division of application No. 13/353,262, filed on Jan. 18, 2012, now Pat. No. 10,360,754, which is a (Continued)

(51) Int. Cl.
*G07F 17/32* (2006.01)

(52) U.S. Cl.
CPC ........ *G07F 17/322* (2013.01); *G07F 17/3227* (2013.01); *G07F 17/3234* (2013.01); *G07F 17/3237* (2013.01)

(58) Field of Classification Search
CPC ............... G07F 17/322; G07F 17/3227; G07F 17/3234; G07F 17/3237
(Continued)

(56) References Cited

U.S. PATENT DOCUMENTS

| | | | |
|---|---|---|---|
| 4,813,675 | A | 3/1989 | Greenwood |
| 5,575,717 | A | 11/1996 | Houriet, Jr. et al. |

(Continued)

OTHER PUBLICATIONS

Office Action dated Sep. 22, 2020 for U.S. Appl. No. 16/219,598 (pp. 1-10)

(Continued)

*Primary Examiner* — Thomas H Henry
(74) *Attorney, Agent, or Firm* — Armstrong Teasdale LLP

(57) ABSTRACT

An integrated active control system includes gaming devices, a server, and a network connecting the server and gaming devices. The gaming devices include gaming terminals and gaming tables. The integrated active control system aggregates gaming transaction information from the gaming devices and determines, for example, the effectiveness of the gaming establishment's floor configuration. Based on this effectiveness determination, at least one of the gaming devices are instructed to change their configuration. Staffing information may also be considered and reconfigured. The integrated active control system further monitors and configures gaming chips. The gaming chips are programmable, and may store monetary chip value and chip identification information. The programmable gaming chips are monitored for tracking the wagers made with the chips as well as for detecting their location.

20 Claims, 11 Drawing Sheets

Related U.S. Application Data continuation of application No. 11/584,917, filed on Oct. 19, 2006, now abandoned.

(60) Provisional application No. 60/728,703, filed on Oct. 19, 2005.

(58) Field of Classification Search
USPC .............................................................. 463/42
See application file for complete search history.

(56) References Cited

U.S. PATENT DOCUMENTS

| | | | | |
|---|---|---|---|---|
| 5,586,936 | A | 12/1996 | Bennett et al. | |
| 5,618,232 | A | 4/1997 | Martin | |
| 5,702,304 | A | 12/1997 | Acres et al. | |
| 5,743,523 | A | 4/1998 | Kelly et al. | |
| 5,761,647 | A | 6/1998 | Boushy | |
| 5,765,910 | A * | 6/1998 | Larkin | A47B 83/001 297/172 |
| 5,836,817 | A | 11/1998 | Acres et al. | |
| 5,993,316 | A | 11/1999 | Coyle et al. | |
| 6,056,642 | A | 5/2000 | Bennett | |
| 6,102,394 | A | 8/2000 | Wurz et al. | |
| 6,117,009 | A | 9/2000 | Yoseloff | |
| 6,126,542 | A | 10/2000 | Fier | |
| 6,186,895 | B1 | 2/2001 | Oliver | |
| 6,203,428 | B1 | 3/2001 | Giobbi et al. | |
| 6,210,279 | B1 | 4/2001 | Dickinson | |
| 6,267,671 | B1 | 7/2001 | Hogan | |
| 6,358,147 | B1 | 3/2002 | Jaffe et al. | |
| 6,364,314 | B1 | 4/2002 | Canterbury | |
| 6,454,649 | B1 | 9/2002 | Mattice et al. | |
| 6,520,500 | B2 | 2/2003 | Pierce et al. | |
| 6,605,003 | B2 | 8/2003 | Suchocki et al. | |
| 6,626,761 | B1 | 9/2003 | Okada et al. | |
| 6,746,327 | B2 | 6/2004 | Frohm et al. | |
| 6,773,347 | B1 | 8/2004 | Marshall | |
| 6,820,875 | B1 * | 11/2004 | Hedrick | G07F 17/3216 312/265.6 |
| 7,548,491 | B2 | 6/2009 | Macfarlane | |
| 7,789,757 | B2 | 9/2010 | Gemelos et al. | |
| 2002/0022518 | A1 | 2/2002 | Okuda | |
| 2002/0107065 | A1 | 8/2002 | Rowe | |
| 2002/0107072 | A1 | 8/2002 | Giobbi | |
| 2002/0142825 | A1 | 10/2002 | Lark et al. | |
| 2002/0142846 | A1 * | 10/2002 | Paulsen | G07F 17/3262 463/43 |
| 2002/0151349 | A1 * | 10/2002 | Joshi | G07F 17/32 463/20 |
| 2002/0151366 | A1 * | 10/2002 | Walker | G07F 17/32 463/42 |
| 2002/0177479 | A1 | 11/2002 | Walker et al. | |
| 2003/0008708 | A1 | 1/2003 | Suchocki et al. | |
| 2003/0027632 | A1 | 2/2003 | Sines | |
| 2003/0045354 | A1 | 3/2003 | Giobbi | |
| 2003/0060270 | A1 | 3/2003 | Binkley et al. | |
| 2003/0064771 | A1 * | 4/2003 | Morrow | G07F 17/323 463/16 |
| 2003/0064805 | A1 | 4/2003 | Wells | |
| 2003/0119579 | A1 | 6/2003 | Walker | |
| 2003/0153377 | A1 | 8/2003 | Lisowski | |
| 2003/0153385 | A1 | 8/2003 | Ikeya | |
| 2003/0199295 | A1 | 10/2003 | Vancura | |
| 2004/0023714 | A1 | 2/2004 | Asdale | |
| 2004/0038721 | A1 | 2/2004 | Wells | |
| 2004/0048667 | A1 | 3/2004 | Rowe | |
| 2004/0106449 | A1 | 6/2004 | Walker | |
| 2004/0229693 | A1 | 11/2004 | Lind et al. | |
| 2004/0242297 | A1 | 12/2004 | Walker | |
| 2004/0259627 | A1 * | 12/2004 | Walker | G07F 17/34 463/20 |
| 2005/0009601 | A1 * | 1/2005 | Manfredi | G07F 17/3239 463/29 |
| 2005/0037837 | A1 | 2/2005 | Rowe | |
| 2005/0075155 | A1 | 4/2005 | Sitrick | |
| 2005/0153776 | A1 | 7/2005 | LeMay et al. | |
| 2005/0181861 | A1 * | 8/2005 | Kodachi | G07F 17/34 463/20 |
| 2006/0001677 | A1 * | 1/2006 | Webb | G01J 3/526 345/594 |
| 2006/0030404 | A1 | 2/2006 | Pohlman | |
| 2006/0030410 | A1 | 2/2006 | Stenton et al. | |
| 2006/0058093 | A1 | 3/2006 | White et al. | |
| 2006/0058102 | A1 | 3/2006 | Nguyen | |
| 2006/0068879 | A1 | 3/2006 | Crawford, III | |
| 2006/0131809 | A1 * | 6/2006 | Lancaster | G07F 17/3293 273/292 |
| 2006/0148560 | A1 | 7/2006 | Arezina | |
| 2006/0178205 | A1 | 8/2006 | Bleich et al. | |
| 2006/0183544 | A1 | 8/2006 | Okada | |
| 2006/0287098 | A1 * | 12/2006 | Morrow | G07F 17/3209 463/42 |
| 2007/0004510 | A1 | 1/2007 | Underdahl | |
| 2007/0072678 | A1 | 3/2007 | Dagres | |
| 2007/0099707 | A1 | 5/2007 | Smit | |
| 2007/0135202 | A1 | 6/2007 | Linard et al. | |
| 2007/0281775 | A1 | 12/2007 | Kashima | |
| 2008/0054561 | A1 * | 3/2008 | Canterbury | G07F 17/3202 273/148 B |

OTHER PUBLICATIONS

Office Action dated Jan. 27, 2021 for U.S. Appl. No. 16/219,598 (pp. 1-12).
Office Action dated Apr. 5, 2021 for U.S. Appl. No. 16/449,115 (pp. 1-10).
Office Action dated Jun. 15, 2021 for U.S. Appl. No. 16/219,598 (pp. 1-12).
Office Action (Final Rejection) dated Nov. 9, 2021 for U.S. Appl. No. 16/219,598 (pp. 1-16).
Office Action (Final Rejection) dated Dec. 6, 2021 for U.S. Appl. No. 16/449,115 (pp. 1-12).
Office Action (Non-Final Rejection) dated Mar. 4, 2022 for U.S. Appl. No. 16/219,598 (pp. 1-16).
Office Action (Non-Final Rejection) dated Jun. 2, 2022 for U.S. Appl. No. 16/449,115 (pp. 1-20).
Office Action (Non-Final Rejection) dated Oct. 18, 2022 for U.S. Appl. No. 16/219,598 (pp. 1-38).
Office Action (Final Rejection) dated Jan. 11, 2023 for U.S. Appl. No. 16/449,115 (pp. 1-13).
Office Action (Final Rejection) dated Jun. 5, 2023 for U.S. Appl. No. 16/219,598 (pp. 1-42).
Office Action (Notice of Allowance and Fees Due (PTOL-85)) dated Sep. 18, 2023 for U.S. Appl. No. 16/219,598 (pp. 1-7)

* cited by examiner

INTEGRATED ACTIVE CONTROL SYSTEM FOR MANAGING GAMING DEVICES

CROSS-REFERENCE TO RELATED APPLICATIONS

This application is a divisional and claims the benefit of U.S. application Ser. No. 13/353,262, filed Jan. 18, 2012, which is a continuation and claims the benefit of U.S. application Ser. No. 11/584,917, filed Oct. 19, 2006, which claims the benefit of U.S. Provisional Application No. 60/728,703, filed Oct. 19, 2005, all of which are incorporated herein in their entirety.

This invention contains subject matter that is related to the subject matter in U.S. Patent Applications entitled "System and Method for Intelligent Casino Configuration," Ser. No. 11/459,232 filed on Jul. 21, 2006, and claiming the benefit of prior filed provisional application Ser. No. 60/701,731 of the same title filed Jul. 22, 2005, the contents of both of which are incorporated herein by reference.

FIELD OF THE INVENTION

The present invention relates to system, methods and apparatus for controlling and managing a floor operation of a gaming establishment and associated gaming devices. More particularly, it relates to such systems, methods and apparatus for collecting, storing, and analyzing data from the gaming devices for controlling and managing the floor operation and for dynamically configuring the gaming devices.

BACKGROUND OF THE INVENTION

Gaming institutions are responsible for managing large amounts of money, employees, and the needs of players or patrons of the institutions. As such, gaming institutions track gaming transactions involving wagers and the like. Gaming institutions may focus on a particular gaming table to see whether the table is taking in more money than it is doling out. Gaming institutions may also focus on the dealer, pit boss, or other casino employees associated with the particular table or other gaming device. As such, the volume of useful transaction information is enormous, and a system and method for gathering and managing the information would be advantageous.

Gaming devices are typical in such gaming establishments. However, the preferences of players and a variety of other conditions lead to rapid changes in the demand for certain types of games. As such, a system and method for configuring gaming devices would also be useful. Changing games on the floor to accommodate player demand can be an expensive and time consuming endeavor. For tables, the actual table may have to be removed and replaced, of the table top graphics (usually provided on a printed felt cloth) may have to be changed to accommodate wagers and changed conditions such as the game pay schedule, wager limits and the like.

A common task within the gaming establishments is accounting for a player's wagers with gaming chips. On occasion, a player inadvertently leaves the establishment without cashing in his chips. As such, a system and method for monitoring the movement of gaming chips would also be desirable.

SUMMARY OF THE INVENTION

According to one embodiment, the present invention is directed to a system for presenting games to players in a gaming establishment. The system includes a plurality of gaming devices each having a game display configurable between a plurality of game display states. The system also includes a controller for said devices, said controller configured to control said game display states, and a host processor configured to issue a command to said controller to change the display state of at least one device. A data acquisition device collects, for said devices, information related to at least one of current device state, device operation, and player identification. A network provides communication between said data acquisition device, controller, and host processor. The host processor is configured to process said collected information with respect to predetermined criteria and if said predetermined criteria is satisfied, issue said command.

According to one embodiment of the invention, the device operation information includes at least one of player wager information, device revenue information, and game play information.

According to one embodiment of the invention, the gaming device is a gaming table having a configurable game display defining a playing surface, wherein the controller is configured to change the game display from a first game to a second game in response to said predetermined criteria.

According to one embodiment of the invention, the gaming device is a gaming terminal, wherein the controller is configured to change a game type from a first game to a second game in response to said predetermined criteria.

According to one embodiment of the invention, device operation data includes data related to the profit of the device.

According to one embodiment of the invention, the predetermined criteria relates to the profit of the device or to an aggregated profit for a plurality of said devices.

According to one embodiment of the invention, the data acquisition device interacts with a programmable gaming chip for collecting device operation data.

According to another embodiment, the present invention is directed to a configurable gaming table which includes a configurable game display defining a playing surface, and a data acquisition device collecting gaming transaction information. The configurable gaming table also includes a network interface transmitting the gaining transaction information to a remote server and receiving a configuration command in response. A processor included in the gaming table changes the game display from a first game to a second game in response to the configuration command.

According to one embodiment of the invention, the gaming transaction information includes at least one of player wager information, table revenue information, table staffing information, and table occupancy information.

According to one embodiment of the invention, the gaming table includes a sensor for identifying a player at a position relative to the playing surface.

According to another embodiment, the present invention is directed to a server for configuring a gaming device in a gaming establishment. The server includes a processor and a memory operably coupled to the processor and having program instructions stored therein. The processor is operable to execute the program instructions which include: selecting a configurable element of the gaming device; setting a configuration parameter for the configurable element; setting a configuration trigger; detecting the configuration trigger; and transmitting a configuration command to the gaming device in response to the detection of the configuration trigger, the configuration command including the configuration parameter. The gaming device is programmed to receive the configuration command and configure the configurable element of the gaming device based on the configuration parameter.

According to one embodiment of the invention, the gaming device is a gaming terminal, and the configurable element is a physical component of the gaming terminal.

According to one embodiment of the invention, the gaming device is a gaming table having a display defining a playing surface, the configurable element is the display, and the configuration parameter identifies a particular game display.

According to another embodiment, the present invention is directed to a method for configuring a gaming device having a game display for displaying a game outcome selected by a game controller. A configurable feature of the gaming device is provided where the feature is independent of the game outcome selected by the game controller. A configuration parameter for the configurable feature is set under control of a configuration controller. A configuration command associated with the configuration parameter is also set under control of the configuration controller. The configuration command is then transmitted to the gaming device. The gaming device is programmed to receive the configuration command and configure the configurable feature of the gaming device based on the configuration parameter.

According to one embodiment of the invention, the configurable feature is a seat coupled to the gaming device, and the configuration parameter identifies a position of the seat.

According to one embodiment of the invention, the configurable feature is a display coupled to the gaming device, and the configuration parameter identifies a position of the display.

According to one embodiment of the invention, the configurable feature is a display setting for the gaming device. The display setting includes at least one of size, color, and shape of images.

According to one embodiment of the invention, the configuration command is issued based on user profile information of one or more players at the gaming device.

According to another embodiment, the present invention is directed to a method for configuring a gaming device where the method includes: receiving user input from a user; configuring the gaming device based on the user input; storing the user input in a user record; detecting the user at the gaming device; retrieving the user record based on the detection of the user; and automatically reconfiguring the gaming device based on the user input stored in the user record.

According to one embodiment of the invention, the reconfiguring of the gaming device includes reconfiguring a position of a seat coupled to the gaming device, a position of a display coupled to the gaming device, or a game property of a game provided by the gaming device.

According to another embodiment, the present invention is directed to a method for managing a value instrument defining currency for play of games provided by a plurality of gaming devices in a gaming establishment. The method according to this embodiment includes: activating the value instrument; configuring the value instrument with a particular currency value; detecting a trigger event; and responsive to the detection of the trigger event, uploading the particular currency value to a player account and deactivating the value instrument.

According to one embodiment of the invention, the value instrument is a gaming chip.

According to one embodiment of the invention, the trigger event is the value instrument leaving the gaming establishment.

According to one embodiment of the invention, the value instrument is remotely configurable from a first value to a second value.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

In the drawings, which constitute part of this specification, exemplary embodiments demonstrating various features of the invention are set forth as follows.

DETAILED DESCRIPTION OF THE INVENTION

Figure 1:
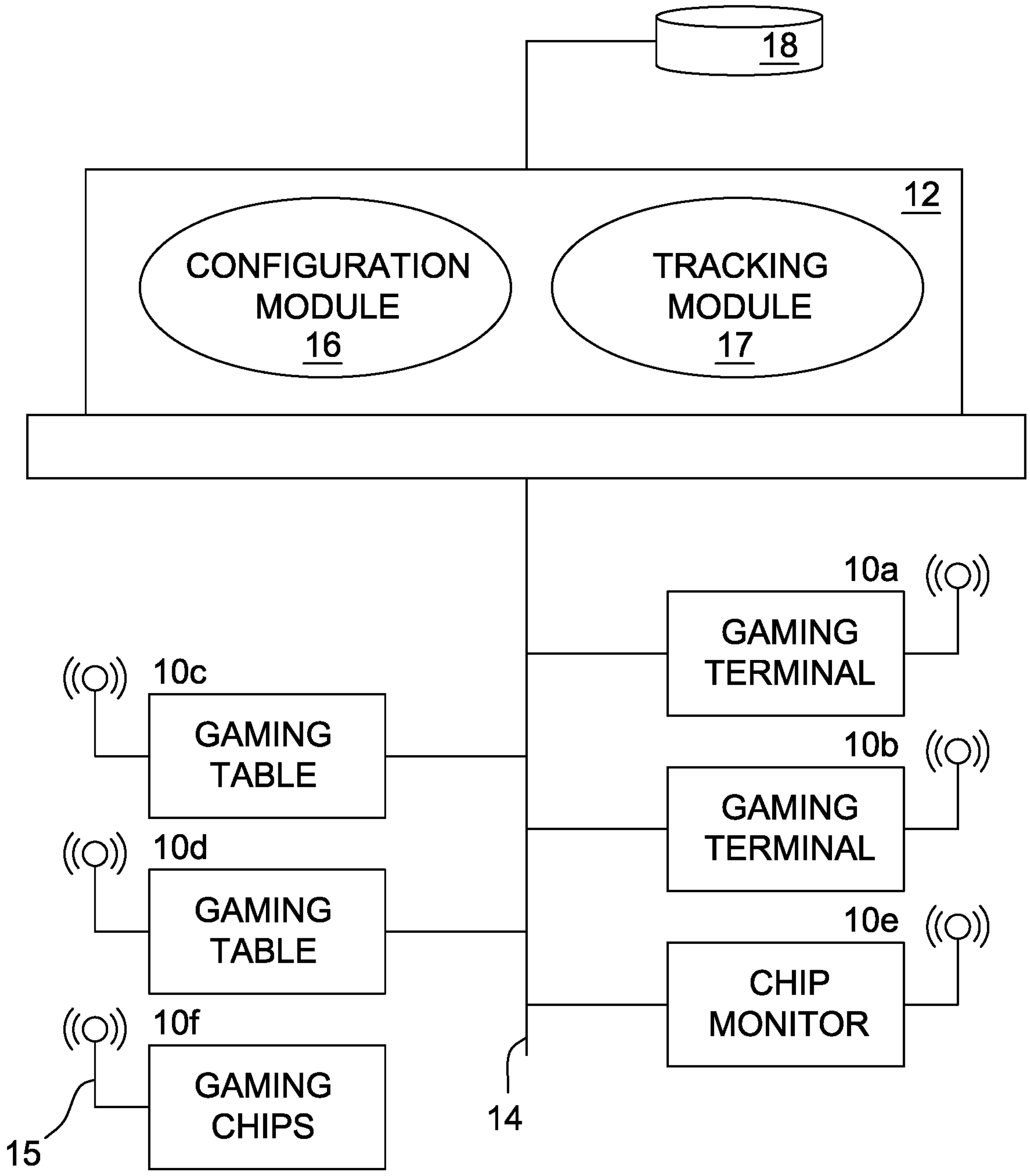
FIG. 1 is a block diagram of a gaming control system according to one embodiment of the invention.

In general terms, the present invention is directed to a integrated active control system including gaming devices, a server, and a network connecting the server and gaming devices. The gaming devices include, but are not limited to, gaming terminals and gaming tables. Exemplary gaming terminals include, but are not limited to, slot machines, video poker machines, keno, video Blackjack, video roulette machines, terminals adapted to receive a downloaded game for play or terminals adapted to play server-based games, whether hardwired or wireless. Exemplary gaming tables include tables for playing Blackjack, Pai Gow, Baccarat, and the like.

The integrated active control system aggregates gaming transaction information from the gaming devices and determines, for example, the effectiveness of the gaming establishment's floor configuration. Based on this effectiveness determination, at least one of the gaming devices are instructed to change their configuration from a first state to a second state. Other information may also be considered and reconfigured, such as, for example, staffing information.

The integrated active control system further monitors and configures gaming instruments, such as, for example, gaming chips defining the currency used to play games provided by the various gaming devices. The gaming chips are programmable, and may store information such as monetary chip value and chip identification information. The programmable gaming chips then communicate such information to other gaming system components for tracking the wagers made with the chips as well as detecting the location of the chips.

Although the below exemplary embodiments are described with respect to gaming devices and instruments typically found on casino floors, a person of skill in the art should recognize that the present invention may be applied in non-casino settings such as, for example, arcades, entertainment centers, or other gaming environments (e.g. hotels, restaurants, theaters, stores, and airports).

One of the factors that contribute to the success of a gaining establishment/environment (collectively referred to as a casino) is the extent in which various gaming devices on the casino floor are used by patrons of the casino. Different mechanisms have been adopted to attract players to the casinos and play the games offered by these gaming devices. One technique is to have the device display engage in a "display" or "attract" mode where the display plays the game, shows promotional features, advertising, or simulates the award of a jackpot, e.g. Royal Flush, award. Inasmuch as games and devices compete on the casino floor for play there is a need for a greater variety of attractive and/or promotional features to be offered by the gaming device.

Once a player has been attracted to a game, it is important to retain the player at the device. If a player is uncomfortable or quickly loses interest or stimulation at a particular gaming device, he or she is unlikely to stay at that device for long. There is a need to enable the player or a system administrator to configure gaming devices to meet at least the physical, operational and visual demands, needs, and desires of players, personnel and operators.

Furthermore, if there is a particular type of game that the player is set on playing, but if the gaming device offering the game is occupied, the player may be prevented from playing the game. Where a group of games are linked to contribute toward a progressive jackpot, when the jackpot is high the demand by players to play the linked devices may far exceed the supply. There is a need to be able to add/remove games from the progressive pool and configure games to meet player demand and system administrator's needs.

In the past, in order to change a game to meet such demands, it was often necessary to reconfigure the game's EPROMs (erasable programmable read-only memories), requiring access to the individual gaming machines. It would be advantageous, however, to provide a system which could dynamically and automatically configure the gaming machines or alter their play state, or some of them, in the casino to meet demand, special occasions, user preferences, and the like. For example, the gaming machines may be reconfigured to change the minimum bet, bet denomination the game available for play or game feature(s).

With respect to casino table games, play of such games have in the past been controlled by a game layout printed on a felt cloth. The layout, for Blackjack for example, has printed betting positions for the players and dealer and may contain other information such as game rules, minimum and maximum wagers and the like. For some table games such as Blackjack, Pai Gow, Baccarat, and others, the game table top has the same shape (i.e. semi circular). However the different wagering propositions and game rules result in different information having to be printed on the layout. Thus, a Blackjack table cannot easily be converted to a Baccarat table since the Blackjack layout felt must generally be removed and replaced by a Baccarat game felt.

It would be advantageous for a casino to have gaming tables that could be automatically configured to change their displays for play of different games or for providing different game information such as, for example, minimum wager and pay schedule information. Reconfiguration may be commanded based upon a predetermined schedule or in reaction to data gathered from the casino floor, such as, for example, gaming transaction information, or as commanded by the operator.

In addition, in large venues where there may be thousands of games, the sheer number of gaming devices and tables on the casino floor frustrate a player in search of particular games to play. Casinos often remove or move games sometimes making it difficult for players to find their favorites. Still further, where there are games linked together to contribute to large progressive jackpots, there is no convenient way for a player at a location to determine the current levels of those jackpots. It would be advantageous if there were a mechanism by which players could conveniently find their favorite games, favorite denomination of games, and determine progressive jackpot levels.

Furthermore, the play habits of players may be monitored at the gaming machines and gaming tables. This may be done via a player loyalty card or instrument which, when read by a reader, provides access to a player account stored in a player tracking system host computer. When a player plays a machine using the loyalty card, "comp points" are recorded, for example, and used to rate the player, provide gifts, provide cash back, and the like.

At gaming tables, the loyalty card is also used to access a player's account. Personnel rate the player by, for example, average bet amount, and the system converts that data, along with the expected performance of the game being played, into comp points or other rating.

For table game play where players are wagering currency or gaming chips, obtaining accurate information regarding transactions often requires human intervention to tabulate the currency and count chips. Accordingly, rating table play often requires personnel to make estimates as to the amounts wagered.

It would be advantageous for a casino to have gaming instruments such as chips, which can be remotely sensed, monitored or reconfigured from a first state to a second state to control and promote play at the casino. In this regard, and according to but one embodiment of the invention, it would be advantageous to provide a system where, upon certain conditions, the value of a gaming chip can be transferred or uploaded to a player's account when, for example, the player leaves the casino or a designated area with the chip.

It would further be advantageous to gather and analyze data regarding players, wagers, cash in, cash out, active gaming tables, date, time, staffing and the like, to anticipate future trends for staffing and game configuration, and/or to prepare analysis reports for management, marketing, and operation purposes.

Accordingly, what is desired is a system and method for managing gaming devices, accounting for player transactions and gaming activities, and reconfiguring gaming devices according to individual needs or desires of a player or system administrator, to cater to different users, for promotions and events, and to meet the demands of players to maximize the use of these devices.

According to one embodiment of the invention, a particular gaming terminal may be configured and reconfigured (collectively referred to as being "configured") based on a predetermined schedule, operator command or in reaction to data gathered from the casino floor. The gathered data may be, for example, occupancy of the gaming terminals, cash in information, cash out information, and other gaming transaction information. In this regard, the gaming terminal is referred to as a morphing gaming terminal.

For example, the gaming terminal may be configured based on special events, holidays, time of day, day of the week, performance of certain devices, player demand, player history, player profile, and the like, responsive to commands transmitted by a central server, a local processor, or manual input by the player or operator. The configuration may relate to the gaming terminal's physical settings, display settings, and game play settings. With respect to the physical settings, a particular gaming terminal may be configured to adjust the terminal's height, dimension, shape, and/or appearance. The gaming terminal may also be configured to adjust the position of seats and game displays, and/or to move, enable, or reveal additional displays. The gaming terminal may also be configured with respect to its tactile feel, such as, for example, the tactile feel of game control buttons, touch screen input devices, or other input devices.

With regard to the display settings, font and symbol size, type, color, presentation such as background colors or images or certain embellishments such as borders, locations of touch screen buttons, and intensity may be configured based on entered or detected player preference data, game mode, and the like.

With respect to the play settings, the particular gaming terminal may be configured to change the game speed, audio settings, video settings, font and graphic sizes and game control button feel and response, responsive to a recognized player at the gaming terminal.

The gaming terminal may also be a generic gaming terminal that may be dynamically configured to provide a particular type of game. In this regard, the physical settings, display settings, and play settings may also be dynamically reconfigured to correspond to the type of game downloaded to the gaming terminal as well as other considerations including player input. For example, game control buttons may be enabled or disabled, and their functionalities modified based on the downloaded game while the player may control the tactile feel or response of the buttons. The terminal's shape and color may also be modified based on the game or game events, e.g. jackpots.

For a gaming table, the game play surface of the table may be embodied as a video display configured to display different game layouts based on a game selected for the gaming table. The height, color, and appearance to the table may also be configured based on special events, holidays, player history, player profile, and the like. The surface of vacant tables may further be controlled to display advertisements, announcements, and the like.

According to one embodiment of the invention, the control system also gathers player identification information for gathering player wager habits, play habits, and the like. The gathered information may then be used to reconfigure one or more gaming devices.

In one embodiment, the player is provided with a player tracking instrument such as a card with a magnetic strip. The instrument is presented to a gaming device or person manning the device prior or during play of a game. This allows the system to associate information about the player's play habits and preferences to the player identification information.

In other embodiments, the player tracking instrument may be a key fob, bracelet or the like. Players may also or additionally be identified by acquiring biometric information (e.g. fingerprint, facial recognition).

According to one embodiment of the invention, the gaming control system also gathers table performance and status information. The gathered information may include gross revenue information, net revenue information, staffing information of the table, current table configuration (e.g. a $10 minimum table, game type), and table location. In one embodiment, table location is mapped when the system is set up. In this scenario, no data acquisition with respect to table location may be needed. Gross revenue includes all the money in at the table, and net revenue includes all the money in minus what is cashed in or what the player walks away with.

The gathering of the casino floor information allows the casino floor to be efficiently managed by controlling staff schedules, reconfiguring games, and the like. For example, if there are idle Blackjack tables while the Baccarat tables are full with players waiting, the idle tables may be configured to Baccarat tables. According to one embodiment of the invention, the Blackjack tables are dynamically and automatically configured by driving a display that defines the table layout to have a Baccarat table game surface. Other reconfigurations may include changing the content of the displays or even side displays for traditional tables, changing game rules, modifying minimum and maximum bets, modifying side bets, providing bonus features, or the like. In addition to changing the table configuration, the system may also issue alerts indicating that additional staffing (e.g. dealers, pit staff) is required.

The information gathered from the casino floor may also be used to produce marketing reports, operations reports, or reports related to accounting for taxes.

According to another embodiment of the invention, the gaming control system provides programmable gaming chips which may be configured with respect to chip value, design, function, and/or the like. Each chip may have a small display which may be remotely controlled to display a value amount associated with the chip, e.g. $100, and/or a particular design, such as, for example, a particular logo, picture, or the like.

According to one embodiment of the invention, the gaming chip may change configuration to be equivalent to multiple virtual gaming chips. For example, if a single gaming chip is assigned a value of $100, the gaming chip may be reconfigured to be an equivalent to four virtual gaming chips, each with a $25 value. This may be desirable if the user wants to place a wager on more than one spot or game at a time, using the gaming chip.

According to one embodiment, in order to prevent gaming chips from leaving the casino, the gaming chips are monitored for detecting whether they have left the casino, deactivating the chips in response to such a detection, and uploading their value to the player's account.

FIG. 1 is a block diagram of an integrated active control system according to one embodiment of the invention. The system includes various gaming devices 10*a*-10*d*, programmable gaming chips (also referred to as value instruments) 10*f*, and one or more chip monitors 10*e* coupled to a central server 12 over a wired or wireless data communications network 14, such as, for example, a local area network, private wide area network, or the public Internet. The central server 12 is further coupled to a storage device 18 storing data for managing the casino floor and the gaming devices on the floor. The gaming devices 10*a*-10*d* may be gaming terminals or gaming tables located in a local gaming environment, such as a casino, and/or a multi-site gaming environment, such as multiple networked casinos.

According to one embodiment of the invention, the gaming terminals 10*a*-10*b*, gaming tables 10*c*-10*d*, chip monitor 10*e*, and programmable gaming chips 10*f* communicate with each other over a second network 15, which may be, for example, a wireless network.

According to the illustrated embodiment, the server 12 includes a configuration module 16 and a tracking module 17. The gaming devices 10*a*-10*d* or chip monitor 10*e* may also be equipped with all or portions of the configuration module 16 and tracking module 17 in order to perform the functions of these modules on a local basis via local controllers.

The configuration module 16 controls, from the central location, the physical settings, display settings, and play settings of one or more gaming devices, and manages other aspects of the casino floor such as, for example, staffing schedules. These settings may be configured based on rules, player preferences, player demands, calendar-based schedules, historical data, and/or manual commands from a system administrator. For example, the system administrator may command the configuration module 16 to group certain gaming devices together for tournaments or progressive play, and display colors or logos to visually identify such devices to reflect the tournaments and mode of play. The system administrator may also command the configuration module 16 to change game location(s), game denomination(s), game content, game appearance, and the like, as is described in further detail in the above-referenced, commonly owned, U.S. application Ser. No. 11/459,232.

The configuration module also manages and configures the programmable gaming chips 10*f*. Players may acquire the programmable gaming chips at various locations within a casino or other gaming organization. For example, the gaming chips may be acquired and/or programmed at the gaming terminals or tables 10*a*-10*d*, casino kiosks, or other locations within the casino. At these locations, a player may deposit money with the casino and/or establish a player account. In exchange, the casino may provide the player with one or more programmable gaming chips 10*f* The programmable gaming chips may each initialized with a particular currency value and other pertinent information. Each gaming chip also stores a unique identifier (e.g. identification number) for allowing the server 12 to trace and monitor each chip in an individual manner.

The tracking module 17 receives and tracks player data from the gaming devices, and may interact with the configuration module for configuring or suggesting a configuration of the gaming devices based on tracked player data. In this regard, each gaming device may include a card reader, biometric reader or other device to identify the player, as is known in the art and as described, for example, in Boushy, U.S. Pat. No. 5,761,647 issued Jun. 2, 1998 and Acres, et al, U.S. Pat. No. 5,702,304 issued Dec. 30, 1997, the disclosures of which are incorporated by reference. For example, upon a detection and identification of a player at a particular gaming device, the tracking module 17 may retrieve the player's preference information from a dedicated player account represented by a data structure at the host server 12 (or a remote server) or storage device 18, and automatically reconfigure the gaming device's physical settings, display settings, and play settings, based on such preference information.

Games may also be suggested to a player based on past games played by the player, game ratings, game availability, newly acquired games, and the like. For example, a "My Favorites" menu may list the games most often played by the player for allowing the player easy access to such games. Such information may also include favorite or most frequent wagering amounts, e.g. 3 coins per line, favorite plays (e.g. favorite Keno plays and wagers) or the like. The tracking module tracks the player's interactions with the gaming device in terms of types of games played, playing habits, wager levels, favorite plays for at least some certain games, and any configuration changes that deviate from default or reconfigured settings, and updates the player's preference information accordingly. In one embodiment, the gaming devices track the player's interactions and sends them to the tracking module operating on the central server.

The tracking module 17 also tracks table performance and status information. Table performance information may include the amount of money the table has made in a given time period, the amount of money taken in at the table, the amount of money that players have left with, and the like. Status information may include information such as the staffing schedule of the table, table location within the casino, and current configuration (e.g. minimum bet, type of game played, etc.).

The tracking module 17 is further configured to track the usage and location of the programmable gaming chips. In this regard, at initialization, the tracking module 17 associates each programmable gaming chip's identification number with the player acquiring the programmable gaming chip. In this way, financial transactions (e.g. betting, adding money, cashing in, etc.) and involving the chip may be associated with the player who acquired the chip and analyzed by the tracking module 17 for determining wagers, cash in amounts, cash out amounts, and the like. The financial transaction information of the players at a particular gaming table may then be used for reconfiguring the particular gaming table or dealer schedule, or reconfiguring other gaming tables or dealer schedules.

The tracking module further tracks the location of the programmable gaming chips and detects when a player having one or more programmable gaming chips leaves the casino. In this case, the configuration module 16 is invoked to deactivate the programmable gaming chips that have left the casino, and credit the player's casino account with aggregate value represented by the deactivated chips.

According to one embodiment of the invention, when a player returns with one or more deactivated gaming chips, the configuration module may reactivate the programmable gaming chips with the amount credited to the player's casino account. Alternatively, once the programmable gaming chips are deactivated due to their leaving the casino premises, they are not reactivated due to their reentry to the casino. The player would have to present the deactivated chips at a cashier or kiosk location to reactivate the chips and assign value to them.

The configuration and tracking modules 16, 17 may be software modules with computer program instructions that are stored in a main memory (not shown). These computer program instructions are executed by one or more processors (also referred to as controllers) (not shown) that are hosted by the server 12 or that are distributed to multiple servers or to the individual gaming devices. A person of skill in the art should recognize, however, that the engines may be implemented in hardware (e.g. ASIC), firmware, or a combination of hardware, firmware, and/or software.

The configuration and tracking modules 16, 17 make use of one or more databases stored in the central mass storage device 18, which may take the form of a hard drive or drive array, for the central configuration and tracking functions. These databases may include, for example, a user database, device database, and configuration criteria database.

The user database may store a plurality of player records, each record identified by a player identifier and storing player preference information, historical playing data, player demographic information, loyalty points, favorite game information, average wager, preferred device configuration, casino account information, and the like (collectively referred to as player preference information). The player records also include gaming chip identifiers associated with the player and financial transactions made with such gaming chips, as well as any chip value amounts uploaded from the programmable gaming chips and credited to the player's casino account.

The user database may also store a plurality of casino staff records, each record identified by a staff identifier and storing staff information including, for example, a number of hands dealt by the dealer per minute, average number of winning players with dealer, dealer schedule, and other staff competency measurements.

The gaming device database may store a plurality of gaming device records, each record identified by a gaming device identifier and storing location and configuration information for the gaming device. For example, the gaming device database may include information on a current configuration for the device including its appearance, operational mode, and other physical, display, and play settings for the device, a default configuration, an "attract-mode" configuration, tournament configuration, certain pre-selected configurations (e.g. holiday configurations), scheduling information (e.g. operational mode can change on certain days or at certain times), staffing schedule of the device, money taken in at the device, money paid out at the device, money taken in at the device per dealer, money paid out at the device per dealer, or the like.

The configuration criteria database may store one or more criteria for triggering configuration of one or more devices. For example, the configuration criteria database may store different trigger events for affecting automatic configuration or reconfiguration of one or more devices. Such trigger events may be holidays, floor events, detected players, calendar-based schedules, jackpots, issuance of bonuses, game popularity, and the like. The configuration criteria database may further store the type of configuration triggered, and the gaming devices 10 to which the configuration is directed. For example, the system administrator may schedule a particular configuration to be implemented at a certain time and/or for a certain time period. For example, a gaming terminal may be commanded to display a particular set of colors or operate in a particular gaming mode, for one time period, and display other colors or operate in other gaming modes, for a second time period. In one specific example, the configuration criteria database may indicate a configuration trigger to be St. Patrick's Day, the particular configuration to be the display of green clovers, and the configuration to be applied to all the gaming terminals on the casino floor.

For a gaming table, the table may be configured to display a set of advertisements or announcements for predetermined time periods, in the event that the table is not in use for playing a game. The gaming table may also be configured for a particular type of game based on a determination that the game is popular at a particular time period. In addition, the gaming table may be configured in terms of who is manning the table. For example, the detection of certain players at the table may cause the table to be reconfigured from a current dealer to a different dealer.

Figure 2:
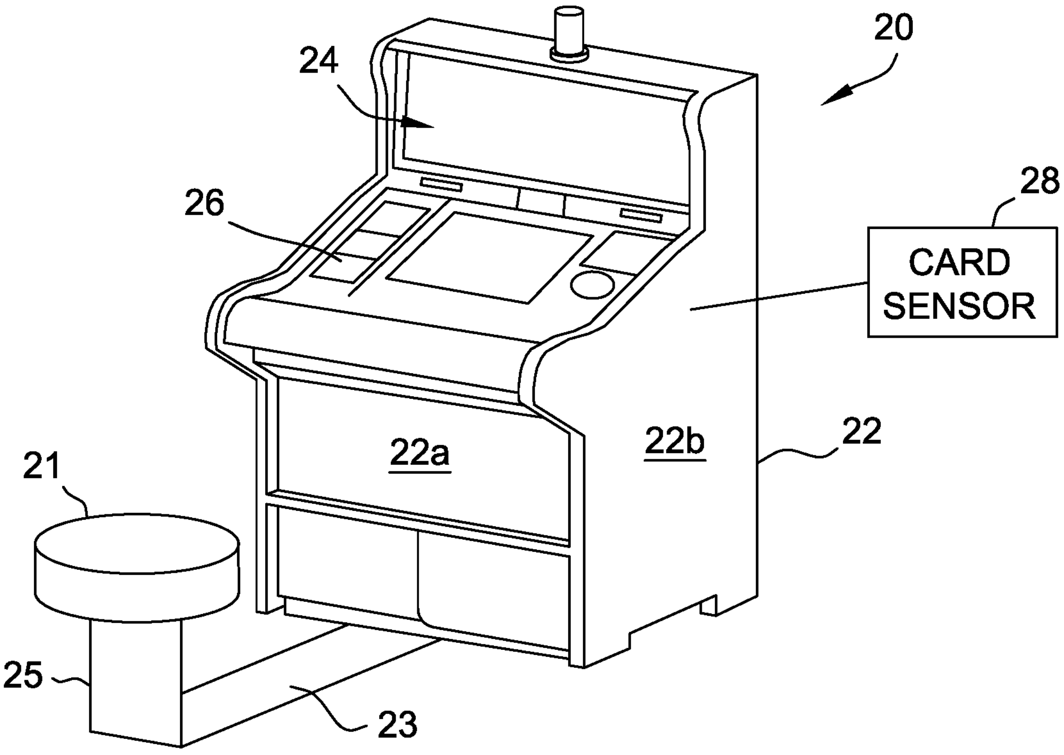
FIG. 2 is a front perspective view of a configurable gaming device taking the form of a configurable gaming terminal according to one embodiment of the invention.

FIG. 2 is a front perspective view of a configurable gaming device taking the form of a configurable gaming terminal 20 according to one embodiment of the invention. The gaming terminal 20 includes a housing 22 made up of a front panel 22*a*, side panels 22*b*, and a back panel (not shown). One or more of these panels may be reconfigured to display a particular color, shape, or pattern. For example, one or several panels may be made of a transparent or translucent material which allows one or more lights behind the panel to illuminate the panel. In a typical arrangement the terminals 20 would be arranged in a side-by-side and back-to-back relationship on the casino floor, thus presenting only the front panel 22*a* and perhaps one side panel 22*b*. The lights are controlled to cause the panels to appear in a particular color, and/or to cause the panel to display a particular pattern or color pattern. According to another embodiment of the invention, in lieu or in addition to the changeable lights, digital ink may be employed on one or more panels to change a pattern or design or lettering on the panel. Alternatively the panels may be embodied as or reveal therethrough plasma displays, LCD displays or other forms of electronic displays for causing one or more panels of one or more selected device to change color, appearance or display pattern.

The housing 22 further includes a game display top box 24 that may be configured in various ways. For example, the top box 24 may be configured to tilt forward or backward, rotate left or right, retract, and/or be pulled forward or pushed backward, based on entered or detected user preference information. Additional game top boxes 24 may also be revealed based on a particular game feature or command. Such additional displays may, for example, extend from above top box 24 on either side thereof. The top box 24 may be, according to a commanded configuration, provide only color or advertising material or signage having no connection to the display of game play elements and in another configuration become activated to provide a game display which displays all or part of a game outcome or bonus feature.

The top box 24 or panels 22*a*-22*b* may also be configured to change color when the terminal 20 receives a bonus, or is selected from the casino floor for some feature.

The display's visual settings may also be configured to provide different font sizes and/or type, symbol sizes and shapes, color, intensity, and/or the like. For example, a player may be able to choose colors, patterns, or game symbols from a menu of such colors, patterns, or symbols, to reflect the player's personality, mood, favorites, or type of game. The housing of the gaming terminal may also change color to complement the display. For example, if the player selects a light blue background for the game display, the panel 22 a may take on a darker blue color to complement the player color selection.

Also included in the housing are various input devices 26 manipulated by a user for manually configuring the gaming device, display, game play, and providing other user input. The input devices may take the form of control buttons, switches, or the like. Pressure sensitive (touch screen) technology may also be incorporated in the display 24 so that the user may interact with the gaming terminal 20 by merely touching certain portions of the display. Microphone and other audio detection hardware and software may also be included into the gaming device to allow the user input to take the form of voice commands.

According to one embodiment of the invention, the buttons, switches, and/or touch-screen buttons may be dynamically configured depending on the recognized player, selected game, and the like. In this regard, programmable switches, such as, for example, programmable switches sold by NKK Switches of Scottsdale, Arizona, under the trademark of Smartswitch™, may be used as the input device. Such programmable switches may be configured to provide different functions based on received commands, and further be configured to display particular text, character, or still or moving images associated the configured functions. The tactile feel and/or response of the switches may also be configured based on a selected game or user preference information. For example, the tactile feel may change based on the function assigned to the switch to allow a player to quickly assess its function by merely touching the switch. The switch may also provide different visual and/or audio responses based on the assigned function. If a particular switch is disabled for the current game configuration, the switch may be rendered dark to indicate that the switch is disabled. The input devices may also be configured with respect to their location, tilt, and the like.

According to one embodiment of the invention, coupled to the gaming terminal 20 is a card reader 28 configured to read a loyalty club card or tag issued to players who are enrolled in a loyalty club program. The card reader 28 may receive information stored in/on the loyalty club card or tag via any wired or wireless communication mechanism known in the art. The card reader 28 may also be configured to read encoded information form the card (such as a unique identification number) for gaining access to the player's records stored at the host server 12 over the data communications network 14. A person of skill in the art should recognize that other types of sensor or player identifier may be used for recognizing the player, such as, for example, biometric sensors for fingerprint, eye, ear, voice, or face recognition. For example, programmable gaming chips associated with a player can also be used to recognize a player.

Data acquisition devices such as the card readers, biometric sensors, and other sensors allow the system to recognize the player, access the player's account, and acquire, store, and process data about the player, such as, for example, his or her playing habits, favorite games, configuration preferences, and other player preference information. The collected information may then be used to customize physical, display, and game play settings of the gaming terminals to attract players to use, and to continue using, the gaming terminals.

According to one embodiment of the invention, identification of the players at the gaming terminal also allows the gaming terminal to automatically track player wagers, financial transactions, and other gaming transactions. The collected information may be stored locally at the table or transmitted to the tracking module for storing in the player record.

According to one embodiment of the invention, the gaming terminal 20 is further coupled to a seat 21 that may be manually or automatically adjusted based on manual inputs from the user or detected user preference information. For example, the seat may be adjusted vertically on path 25 to control its height, and horizontally on path 23 to control its distance from the gaming terminal 20.

In one example of configuring the gaming terminal, upon player recognition, seat height, visual settings, game button tactile feel, speed of play, audio settings, and the like, may be automatically changed upon recognition of a player at the gaming terminal. Specifically, information about the player's height sensed at the device or stored in the player's account, may be used to automatically change the height and/or distance of the seat 21, and height and/or tilt of the display 24. Information about the player's age may be used to adjust the font size, audio settings, and game speed. Furthermore, instructions and other textual information may be displayed in the player's preferred language. Certain games may also be recommended based on the user's playing history, age, gender, and the like. Certain new games may be suggested to the player based upon the acquisition and processing of player data.

According to one embodiment of the invention, the gaming terminal may even be configured to accept money in various forms and assign a corresponding value to one or more programmable gaming chips that are then dispensed to the player by the gaming terminal. The player may enter, at the gaming terminal, the player identification information, or the player identification information may be automatically retrieved based on the player's loyalty card. The identification information is then used to associate the programmable gaming chip with the player and/or the player's casino account as stored in the player records.

Figure 3:
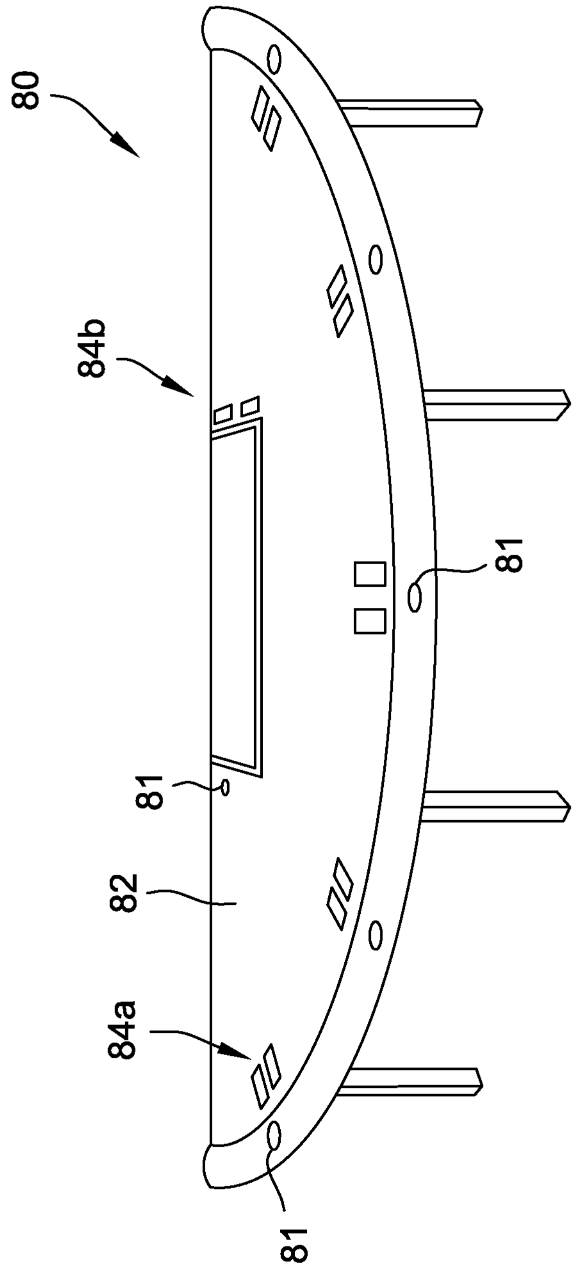
FIG. 3 is a top perspective view of a configurable gaming device taking the form of a configurable gaming table according to one embodiment of the invention.

FIG. 3 is a top perspective view of a configurable gaming device 10 taking the form of a configurable gaming table 80 (also referred to as a morphing table) according to one embodiment of the invention. Morphing tables permit a casino to maximize its use of space and allows a smaller casino to operate on a larger scale to emulate a larger casino. Morphing tables allow a casino to offer a range of games at different times throughout the day to match game play with traffic.

According to one embodiment, the gaming table includes a display 82 occupying most of the top portion of the gaming table, and one or more input devices 84*a*, 84*b* (also referred to as data acquisition devices) located proximate each player position at the table and/or at a dealer control position. The input devices 84*a*, 84*b* may be similar to the input devices 26 of the gaming terminal 20. In addition or in lieu of the input devices 84*a*, 84*b*, touch screen technology may be incorporated into the display 82 for allowing input by touching the relevant portions of the display at the player and/or dealer positions at the table 80.

The input devices 84*a*, 84*b* may be manipulated to locally configure the gaming table 80 for a particular game. According to another embodiment of the invention, the gaming table 80 may be remotely configured by the central server 12 based on commands transmitted over the data communications network 14.

According to one embodiment of the invention, the gaming tables are configured based on a predetermined schedule or based on casino floor data collected and tracked by the tracking module 17. Such data may allow determination, for example, of the efficiency of the casino floor configuration. The efficiency may be measured, for example, by comparing a number of occupied tables offering a particular game (and any wait list associated with such tables) as opposed to the number of un-occupied tables offering different games.

Based on the schedule information or tracked casino floor data, a particular gaming table may be configured to permit play of blackjack, and then roulette, and then poker. This flexibility may also permit several games to be played by the same players as part of a running multi-table game tournament (e.g. a table game triathlon), or may permit several different table games being played all at the same time at the same table.

According to one embodiment of the invention, the table may permit play of non-table games either in-between, during, or as part of an enhanced table game. For example, an electronic keno game may be displayed for playing in-between hands of Blackjack or as part of a bonus round to a table game.

If locally configured, the input devices 84*b* may be used by a game dealer to select from a menu of available table games, Selection of a particular table game may cause the display 82 to provide a game layout, identify player positions, display text (e.g. game rules, pay outs) for playing the selected game. The height of the table may also be adjusted based on whether the players are to be in a standing or sitting position around the table. If chairs (not shown) are placed around the table 80, they may be automatically adjusted based on the selected game or based on the recognized player occupying the chair as is done for the configurable gaming terminals, to an ergonomically optimal structure to suit the player's size or seating preference. In addition, cup holders, ashtrays, and the like may be provided, adjusted, or hidden based on personal player preference information.

According to one embodiment of the invention, data acquisition devices are used to acquire data about players, dealers, and/or programmable gaining chips at the gaming table. A particular data acquisition device may be a sensor 81 similar to the sensor 28 of FIG. 2, which is placed in association with the chair or player position for each player. A sensor may also be placed near a dealer position for recognizing the dealer manning the table and acquiring data about the dealer.

The sensors allow identification of the players and the programmable gaming chips for acquiring and tracking information on player wagers and other financial transactions. Identification of the dealer allows tracking the number of hands dealt, correlation between dealers and players, and overall dealer performance.

The information acquired by the acquisition devices may be stored locally at the table or transmitted to the tracking module 17 at the central server 12 for storing in the player or staff record. According to another embodiment, player wagers and financial transactions may be manually recorded either in part or in whole by a dealer or other casino personnel via the input devices 84*b*, Such information may then be included in the player records that are ultimately stored at the gaming terminal and/or the server.

According to one embodiment of the invention, the data acquisition device may also be an eye tracking device for tracking a player's eye movement and deducing information about the player based on the tracked eye movements.

As an added feature, the input devices 84*a* may be used by individual players to configure portions of the display 82 proximate the player's position. For example, one player may choose to have a certain color, image, or other display at his position, while another player may choose a different color, image, or other display.

The gaming table 80 may also be configured to support or enhance a variety of sensory stimuli to the player and those in his or her immediate surrounding via the emission of sounds, smell, warmth, and color, engaging all five senses of the player. For example, a smell emitter, aroma dispenser, or oxygen dispenser dispensing flavored oxygen may be installed on or nearby the tables for the emission of a particular smell.

According to one embodiment of the invention, when the gaming table is not in use for a particular game, the display 82 may be configured to display one or more advertisements locally stored at the gaming table, or transmitted by the central server 12 over the data communications network 14. Similar advertisements may also be displayed on the display 24 of the gaming terminals 20.

According to one embodiment of the invention, the display 82 may take the form of a CRT, plasma, LCD, OLED, rear projection, or any other display monitor conventional in the art. Preferably, the display is of a temper resistant kind that allows viewing of the display from all angles, and which minimizes the glare and stains on the display.

Figure 4:
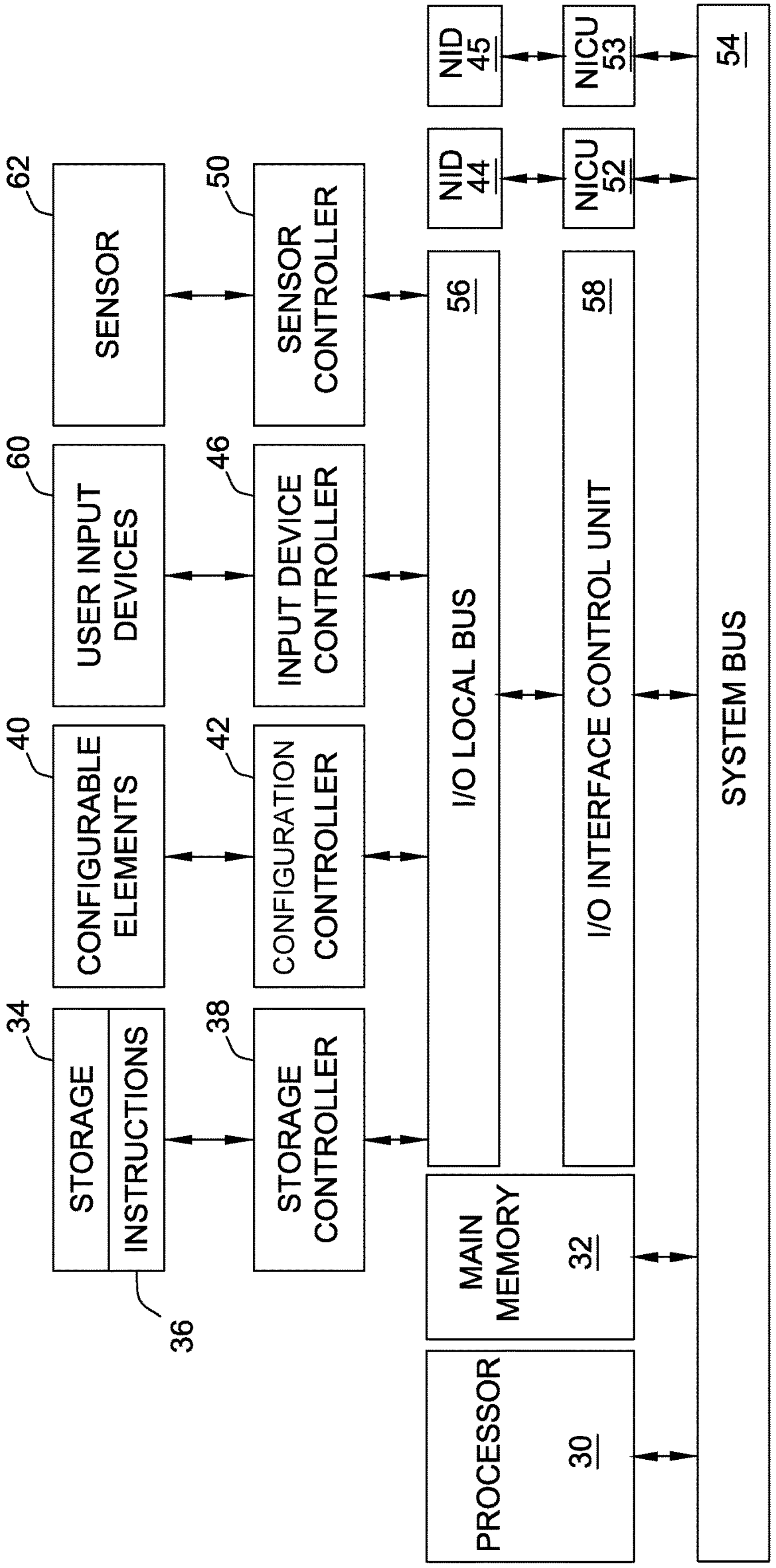
FIG. 4 is an architecture block diagram of a configurable gaming device according to one embodiment of the invention.

FIG. 4 is an architecture block diagram of the gaming devices 10*a*-10*d* according to one embodiment of the invention. The illustrated block diagram may also depict the architecture of the chip monitor 10*e* according to one embodiment of the invention.

The gaming device 10*a*-10*d* includes a processor 30 (local controller) operatively coupled via a system bus 54 to a main memory 32 and an input/output (I/O) interface control unit 58. The I/O interface control unit 58 is operatively coupled via an I/O local bus 56 to a storage controller 38. The processor 30 is coupled via the I/O interface control unit 58, the I/O local bus 56, and the storage controller 38, to a storage device 34. Computer program instructions 36 for implementing different functions of the gaming device 10*a*-10*d* are stored in the storage device 34 until the processor 30 retrieves the computer program instructions and stores them in the main memory 32. The processor 30 then executes the computer program instructions stored in the main memory 32 to implement a particular function. Such functions may include game playing and device configuration functions.

The I/O interface control unit 58 is also operatively coupled via the I/O local bus 56 to a configuration controller 42. The configuration controller 42 controls various configurable elements 40 of the gaming device 10*a*-10*d*, such as, for example, display monitors, seats, lights, audio systems, smell emitters, input buttons, terminal/table housing, and/or any other physical elements that may be configured and reconfigured.

Player commands are input by the player using user input devices 60 controlled by an input device controller 46 via a Universal Serial Bus (USB) communications link or via any wired or wireless connection known in the art. The user input devices 60 may be similar to the input devices 26, 84*a*-*b* of FIGS. 2 and 3.

Player preference data is retrieved from the central mass storage device 18 or the local storage device 34 based on the player ID information stored in the player's loyalty card or programmable gaming chip. The player's loyalty card or programmable gaming chip is sensed by a sensor 62 controlled by a sensor controller 50 via a Universal Serial Bus (USB) communications link or via any wired or wireless connection known in the art. The sensor 62 may be similar to the card sensor 28 of FIG. 2 or sensor 81 of FIG. 3.

Commands from the central server 12 are received by a wired or wireless network interface device 44 controlled by a network interface control unit 52, and forwarded to the processor 30 via the system bus 54. Communications with the programmable gaming chips 10*f* are received by a wireless network interface device 45 controlled by a network interface control unit 53, and forwarded to the processor 30 via the system bus 54.

According to one embodiment of the invention, various types of configurations may be commanded by the central server 12 or manually input by a player. Configuration commands from the central server 12 are transmitted to the appropriate gaming devices, and such commands processed by the respective processor 30 for instructing the configuration controller 42 to configure one or more configurable elements 40 accordingly.

Configuration commands manually input by a player are locally processed by the processor. The entered commands may be transmitted to the central server and saved in the player's record file as a reflection of the player's preferences. The changed configuration may also be stored in the device database as the current configuration for the device. Next time the player accesses the same type of gaming device, the player's preference information may be automatically retrieved from the player database and the device's configuration automatically adjusted based on the retrieved preference information.

Figure 5:
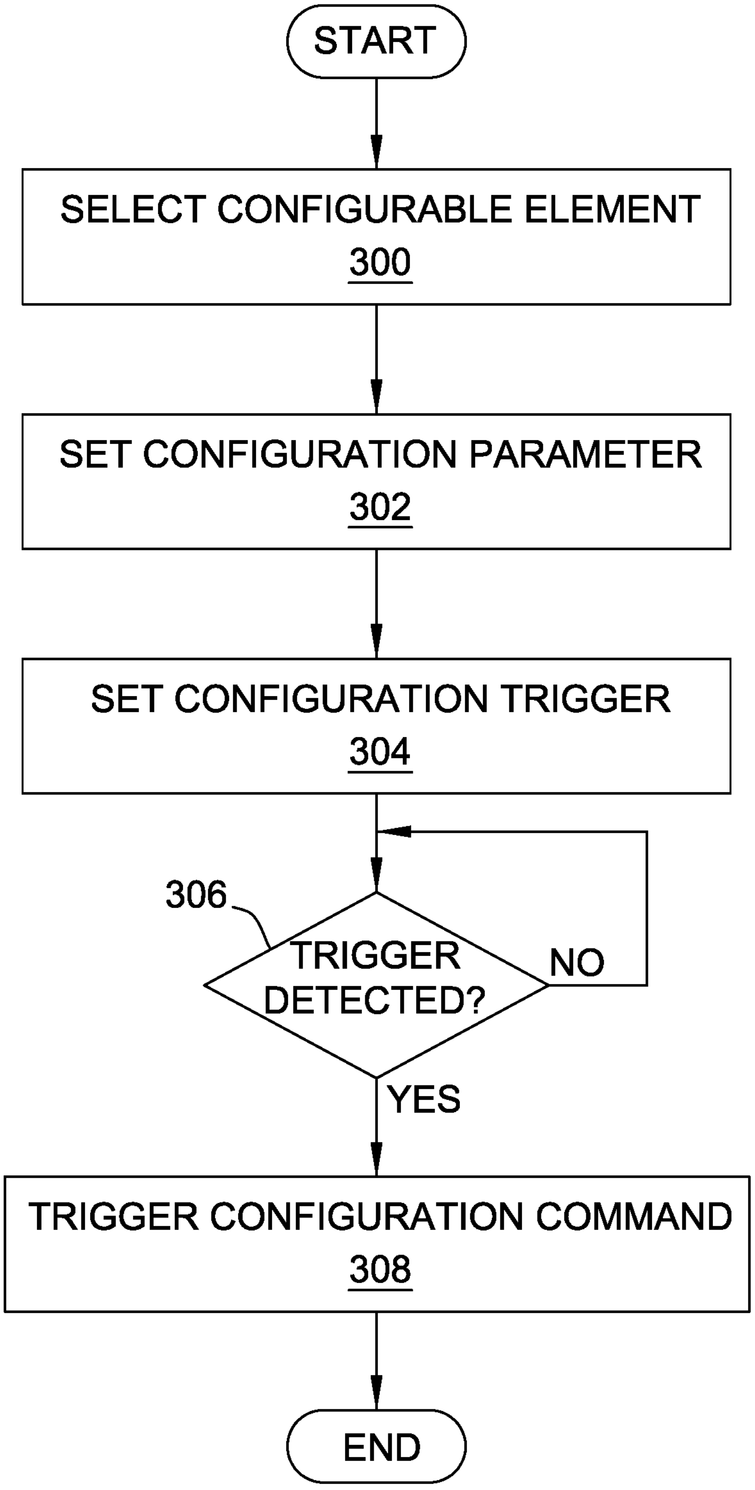
FIG. 5 is a flow diagram of a process for configuring a gaming device according to one embodiment of the invention.

FIG. 5 is a flow diagram of a process for configuring a gaming device according to one embodiment of the invention. The process may be described in terms of a software routine stored in memory and executed by a processor (central controller) included in the server 12. A person of skill in the art should recognize, however, that the routine may be executed via hardware (e.g. via an ASIC), firmware, or in any combination of software, firmware, and/or hardware. Furthermore, the steps of the process may be executed in the indicated order or in any other order recognized by a person of skill in the art.

In step 300, a system administrator accesses the configuration module 16 and selects a configurable feature or combination of configurable features. Additionally and alternatively, a player may select a player configurable feature at the gaming terminal or table. The configurable feature may be associated with the physical configuration of the gaming device such as, for example, the gaming device's display monitors, seats, lights, audio systems, smell emitters, input buttons, terminal housing, and/or the like. If the gaming device is a gaming table, the height of the table may be another configurable feature. The configurable feature may also include display settings, game play settings, dealer staffing, and the like. In one example, the system administrator selects as the configurable feature, the game terminal housing panels.

In step 302, the system administrator sets a configuration parameter for the configurable feature. For example, the configuration parameter for the physical configuration of the seat may identify a position of the seat on paths 23 and 25. For the monitors, the configuration parameter may identify a position of the monitor, such as, for example, a tilt or rotation angle. The configuration parameter may also identify any additional monitors to be invoked, as well as the location of such additional devices. For the housing, the configuration parameter may identify a color, pattern, or dimension, shape, or height of the entire housing and/or certain panels of the housing.

For the display setting, the configuration parameter may identify a font size, symbol size or shape, background, foreground, symbol, font colors, advertisements to be displayed, and the like. For a gaming table, certain display settings may be applied to only portions of the gaming table display 82, such as, for example, portions of the display that are proximate to a particular player. If the display setting relates to a gaming table, the configuration parameters may also specify the particular game(s) to be displayed, the layout of such game(s), and the like. One or more different game layouts may be concurrently displayed on the gaming table display 82 to allow several different table games to be played at the same time at the same table.

For the game play setting, the configuration parameter may identify a minimum bet amount, bet denomination, side bet/bonus features, game rules, game type, game speed, pay schedule, response of game control buttons, tactile feel of the game control buttons, and/or the like.

The configuration parameters may further identify a number of staff members or one or more specific staff members to be scheduled for particular gaming tables.

In the above example, the configuration parameter includes the words "Progressive Play" for displaying these words on the terminal housing panels.

In step 304, the system administrator sets a configuration trigger that will invoke the particular configuration. The configuration trigger may be based upon a predetermined schedule or in reaction to data gathered by the tracking module 17 from the casino floor.

For example, the configuration trigger may be a particular time period in which the configuration is to be invoked. The time period may be identified in terms of a start day, time, and/or duration. The configuration trigger may also identify a particular event, such as, for example, a particular holiday, tournament, jackpot win, and the like. The configuration trigger may further identify a particular user profile, such as, for example, a particular age, nationality, or player history, or particular demographics detected at particular gaming devices, prior to invoking the configuration. In yet another example, the configuration trigger may specify a number of gaming devices offering a particular game that are to be occupied prior to reconfiguring idle gaming devices to the particular type of game, or a threshold table performance (wins, revenue, wagers, number of hands per minute, and the like) prior to invoking the configuration.

In the above example where the words "Progressive Play" are to be displayed, the configuration trigger indicates a particular start date and duration for the display. The configuration parameters and triggers are then stored in a configuration criteria database.

The configuration parameters and triggers may be set individually for each device, for a group of identified devices for the gaming devices in one or more sections of the gaming floor, or for an entire gaming establishment. In this regard, the configuration module may provide a configuration graphics user interface (GUI) similar to the graphics user interface of the above-referenced U.S. application Ser. No. 11/459,232. The configuration GUI may be designed to allow the system administrator to easily select the configurable elements, configuration parameters, and gaming devices. For example, the GUI may provide a menu/tool bar with various configuration elements and possible parameters for such elements.

The menu/tool bar may further allow the viewing, editing, and reporting of the configuration of the gaming devices. For example, management, marketing, and operation reports may be provided based on information collected by the tracking module 17. A graphical map of a gaming floor may also aid the system administrator to reconfigure, enable or disable, or lock or unlock (e.g. to prevent reconfiguration download) particular gaming devices.

As the tracking module 17 gathers information from the different gaming terminals 10_a_-10_b_, gaming tables 10_c_-10_d_, chip monitor(s) 10_e_, and the like, the configuration module monitors the configuration criteria database for the set triggers. In this regard, the configuration module determines, in step 306, whether a particular configuration trigger has been detected. If the answer is YES, the configuration module generates and transmits, in step 308, a configuration command to one or more gaming devices to which the trigger applies, over the data communications network 14. The configuration command is generated based on data stored in the configuration criteria database, and may identify the configurable element(s), the associated configuration parameter(s), and/or the affected gaming devices. In response to receipt of the configuration command, the gaming device configures the identified configurable element based on the configuration parameter. Thus, in the above example, upon the occurrence of the indicated start date, the words "Progressive Play" are displayed on the housing panels of the identified gaming terminals.

It should be appreciated, therefore, that the affected gaming devices may be automatically detected and reconfigured, from a remote location, without having to physically access and reconfigure the gaming devices, even if such reconfiguration affects the physical properties of the gaming devices.

According to another embodiment of the invention, the configuration module may transmit information on the configuration that is to be implemented, and await authorization by a user of the gaming device before transmitting the configuration command. This may be useful, for example, if a particular configuration (e.g. adjustment of the seat height) is to be implemented based on a detected user profile. In this example, the seat will not be adjusted unless the user indicates that he wants the adjustment to be made.

Figure 6:
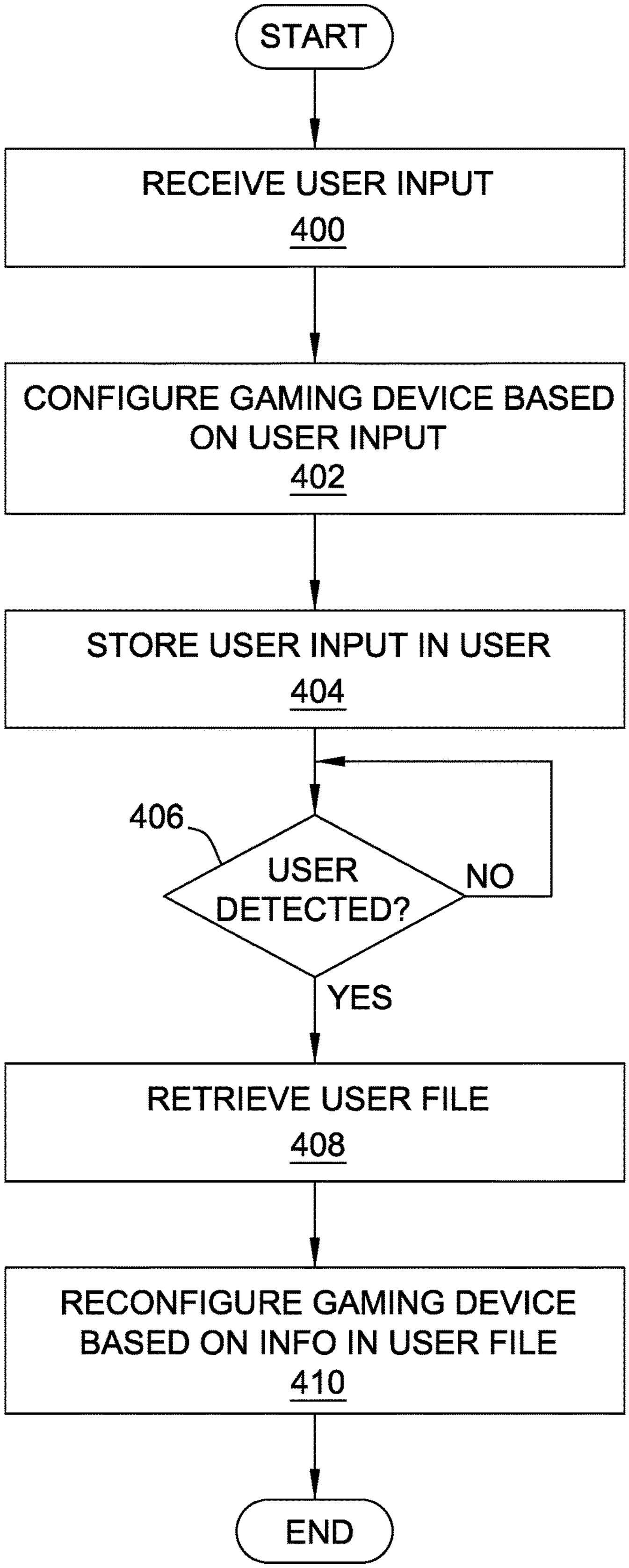
FIG. 6 is a flow diagram of a process for configuring a gaining device according to another embodiment of the invention.

FIG. 6 is a flow diagram of a process for configuring a gaming device according to another embodiment of the invention. The process may be described in terms of a software routine stored in memory and executed by the processor 30 included in the gaming device 10*a*-10*d*. A person of skill in the art should recognize, however, that the routine may be executed via hardware (e.g. via an ASIC), firmware, or in any combination of software, firmware, and/or hardware. Furthermore, the steps of the process may be executed in the indicated order or in any other order recognized by a person of skill in the art.

In step 400, a player provides a user input via the input device 60 coupled to the gaming device. Such user input includes, for example, user demographic information, preferred device settings, and/or actions that cause adjustment of a physical setting, display setting, and/or play setting. In providing the user input, the user may access various menu items and/or respond to questions displayed by the gaming device.

In step 402, the processor 30 instructs the configuration controller 42 to configure the gaming device based on the user input. For example, if the user input includes commands for adjusting the position of the seat 21 or game display 24, the processor causes the seat and display positions to be adjusted accordingly. If the user input includes user demographic information, the processor may suggest particular game and display settings based on such information, and upon user acceptance of the settings, configure the gaming device accordingly. The player may also manually set the game and display settings, such as, for example, the game speed, game symbols to be used, audio settings, font size, display colors, and the like. The user input may also include a selection of a particular game for downloading from the central server, or retrieving from the local data store.

If the gaming device is a gaming table, the gaming table is configured to change the display 82 to provide a game layout, identify player positions, display text (e.g. game rules, pay outs), and the like, via manipulation of the input device 84*b* by the dealer. Each player may also manipulate his/her own input device 84*a* to adjust his or her seat or other devices such as, cup holders, ashtrays, audio, scent, display settings, and the like.

In step 404, the user input is stored in a player record maintained at the local storage device 34 and/or in the user database maintained by the central server 12. In this manner, the user input data may be used for automatically configuring the particular gaming device and/or other similar gaming devices, without having to manually input this information each time.

In this regard, in step 406, a determination is made as to whether the particular player has been detected and recognized at a gaming device. This may be achieved, for example, by reading the player's loyalty card, programmable gaming chip, or tag via the sensor 28 coupled to the device.

In step 408, the recognizing gaming device retrieves the user record file from the local storage device 34 or from the player database maintained by the central server 12. The recognizing gaming device further retrieves from the player record, any configuration information stored for the player for the type of gaming device accessed by the player.

In step 410, the processor coupled to the recognizing gaming device configures the gaming device based on the configuration information. The device database is then updated for the configured gaming device with the configuration information.

According to one embodiment of the invention, upon recognition of the player, a "My Favorites" menu item is displayed on the game display for allowing the player to select a game to be played from a stored list of games. The "My Favorites" menu may include a predetermined number of games (e.g. 10) most often played by the player as detected by the tracking module 17. A game may also be included in the "My Favorites" menu based on the a player's feedback of the game, game popularity, jackpot amount, loyalty points accrued, manual selection by the player, and the like. In this manner, the player need not navigate through a voluminous list of games before finding a game that he or she likes, and that he or she is authorized to download and play.

According to one embodiment of the invention, in addition to tracking and configuring gaming devices, gaming chips are also tracked and may be dynamically configured in terms of their display, value, design, and the like.

Figure 7A:
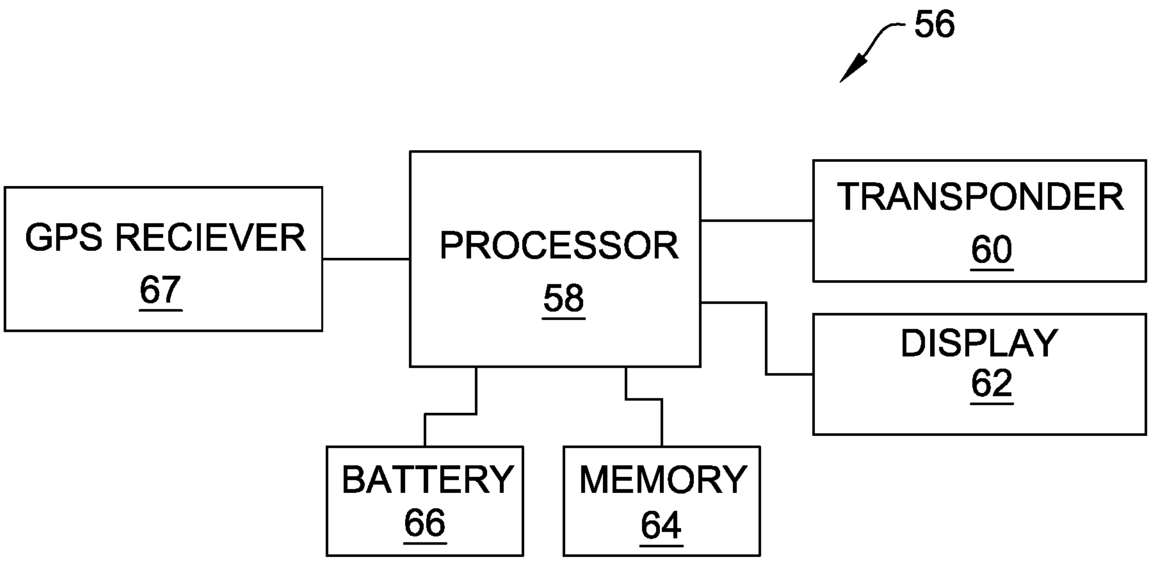
FIG. 7A is a schematic block diagram of a circuit for a programmable gaming chip according to one embodiment of the invention.

FIG. 7A is a schematic block diagram of a circuit for a programmable gaming chip 56 according to one embodiment of the invention. The programmable gaming chip 56 may be similar to the gaming chip 10*f* of FIG. 1, and includes a processor 58 coupled to a transponder 60, display 62, memory 64, battery 66, and GPS (global positioning system) receiver 57. The transponder 60 may be capable of wireless communication with one or more chip monitor(s) 10*e* and sensors 28, 81 included in the gaming devices 10*a*-10*d*. The wireless communication may be achieved via any number of technologies or combination thereof, including but not limited to RF, WiFi, IEEE 802.11, Bluetooth (802.15.1) or RFID.

The display 62 may include any combination of LCDs (liquid crystal displays), LEDs (light emitting diodes), or other suitable devices capable of displaying information. According to one embodiment of the invention, the display displays a current monetary value programmed into the gaming chip, a casino logo, other logos, or any other appropriate information. In one embodiment, the display depicts advertising or event announcements.

The memory 64 stores information such as configuration information or operating instructions for the processor, value information of the programmable gaming chip, a unique programmable gaming chip identifier, remaining battery life information, programmable gaming chip transaction history, programmable gaming chip status (activated or deactivated), and other information appropriate to gaming transactions. The memory may include both volatile and non-volatile memory including, for example, flash memory, EPROMs, EEPROMs, or any other suitable memory type.

The battery 66 supplies power to the processor 58, memory 64, display 62, GPS receiver 67, and transponder 60. The battery may take the form of any number of battery types, including but not limited to, lithium battery, silver-oxide, nickel-cadmium, and the like. The type of battery that is chose my depend on the desired battery life time (e.g. years, days, etc.). In one embodiment, the battery may be recharged by placing the programmable gaming chips in a charging system that is capable of charging multiple programmable gaming chips at one time.

In operation, the processor 58 is configured to poll the transponder 60 for communication with the chip monitor(s) 10*e*, gaming devices 10*a*-10*d*, or other appropriate device. The processor communicates with these devices by supplying appropriate information (e.g. information stored in the memory 64) or storing appropriate information (e.g. chip value information) by storing it as new information or writing over existing information.

According to one embodiment of the invention, the processor 58 tracks player transactions with the chip and stores them in local player records in the memory 64. For example, the process tracks wager amounts, times of such wagers, wins/losses, and the like. The information is uploaded, on a periodic basis, to the tracking module 17 at the central server 12, and stored in the central player records at the central server.

The processor 58 further controls information displayed on the display screen 62. In one embodiment, the value of the chip is displayed along with any logos or other designs. The processor 58 may also report the status of the battery (i.e. battery life remaining) or the location of the programmable gaming chip based on information provided by the GPS receiver 67.

The GPS receiver 67 may be used with the global positioning satellite system to very accurately determine the position of a programmable gaming chip. In accordance with traditional GPS known in the art, the GPS receiver can report the latitude and longitude of the programmable gaming chip. Such information can be relayed to the server and the server can provide a precise description of the location of the chip, especially within the casino. A person of skill in the art should recognize that other technologies may be used instead or in combination with the GPS receiver for monitoring the position of the gaming chips within the casino.

In another embodiment, the programmable gaming chip can be similar to the embodiment described in Oliver, U.S. Pat. No. 6,186,895 "Intelligent Casino Chip System and Method or Use Thereof," the contents of which is incorporated herein by reference.

According to one embodiment of the invention, each programmable gaming chip is initialized with a particular value that is retained by the gaming chip until it is deactivated or cashed-in. As such, a player may have multiple of such chips with various values programmed into the chips. According to another embodiment of the invention, the player is afforded a single chip with a value that may be recalculated and reprogrammed into the chip as the player uses the chip to make wagers and play different games.

Figure 7B:
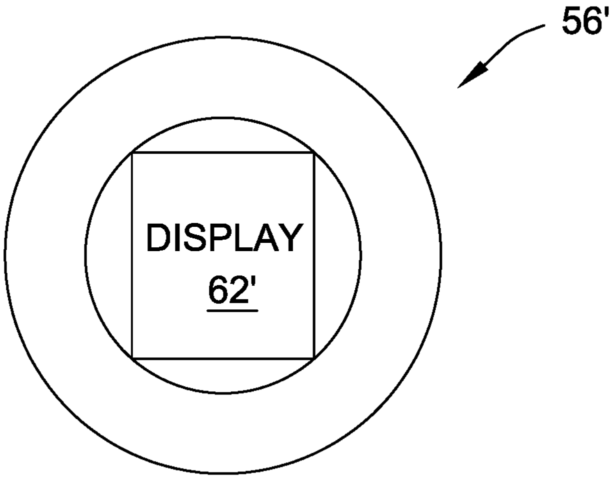
FIG. 7B is a top view of a programmable gaming chip according to one embodiment of the invention.
Figure 7C:
FIG. 7C is a side view of the programmable gaming chip of FIG. 7B.

FIG. 7B is a top view of a programmable gaming chip 56' according to one embodiment of the invention. The illustrated programmable gaming chip includes a display screen 62' on one or both sides of the chip. FIG. 7C is a side view of the programmable gaming chip of FIG. 7B. According to one embodiment of the invention, the programmable gaming chip may be in the form of a rectangular card. Alternatively, the programmable gaming chip may take a more conventional form, such as, for example, a round chip. A person of skill in the art should recognized that the chip may also take any other suitable shape, such as, for example, a square chip.

Figure 8:
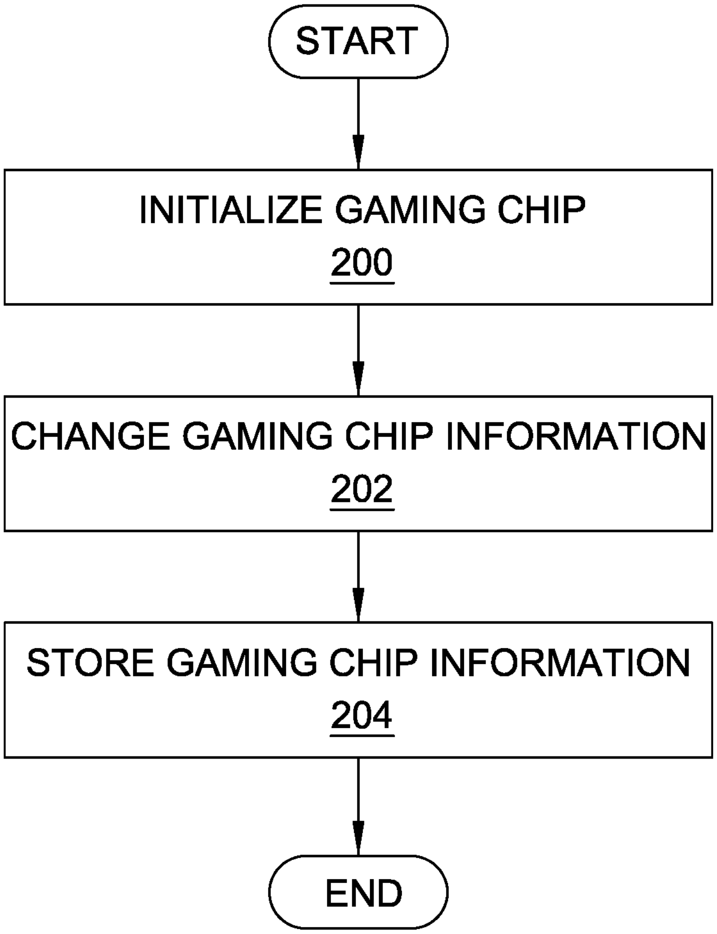
FIG. 8 is a flow diagram of a process for managing gaming chips according to on embodiment of the invention.

FIG. 8 is a flow diagram of a process for managing gaming chips according to on embodiment of the invention. The process may be described in terms of a software routine stored in memory and executed by a processor included in a chip management device. The chip management device may be a gaming device 10*a*-10*d*, casino kiosk, or any other computer device located within the casino and configured for gaming chip management. A person of skill in the art should recognize, however, that the routine may be executed via hardware (e.g. via an ASIC), firmware, or in any combination of software, firmware, and/or hardware. Furthermore, the steps of the process may be executed in the indicated order or in any other order recognized by a person of skill in the art.

In step 200, the chip management device initializes one or more programmable gaming chips to be dispensed to a player. As part of the initialization, pertinent information is stored in the chip's memory 64 such as, for example, chip value and/or player identification information. According to one embodiment of the invention, each programmable gaming chip includes a unique identifier, and this identifier is associated with the player identification information in a local player record in the chip and/or centrally at the central server 12.

Once associated with a particular player, the usage of the programmable chip(s) to make wagers may be tracked by the tracking module 17 and used for configuring the casino floor, generating reports, awarding comp points, and making other advertising and marketing decisions.

In the embodiment where a single programmable chip is used, the programmable chip is reprogrammed to reflect its updated value as the chip is used to make wagers. In this regard, in step 202, the value stored in the chip is updated as the player's wins and losses with the programmable chip are computed. The updated value information may be computed and wirelessly transmitted by the gaming devices 10*a*-10*d* each time the programmable chip is used to make a wager at the gaming devices 10*a*-10*d*. According to another embodiment, the value may be updated manually by a dealer or other game operator. In this regard, the gaming chip information including the chip value is updated in step 202. In step 204, the updated gaming chip information is stored by the programmable chip. The updated information may also be sent to the central server 12 and stored in association with the player's record.

According to one embodiment of the invention, in order to prevent chips from leaving the casino, the position of the chips are monitored and deactivated if they are detected as leaving the establishment.

Figure 9:
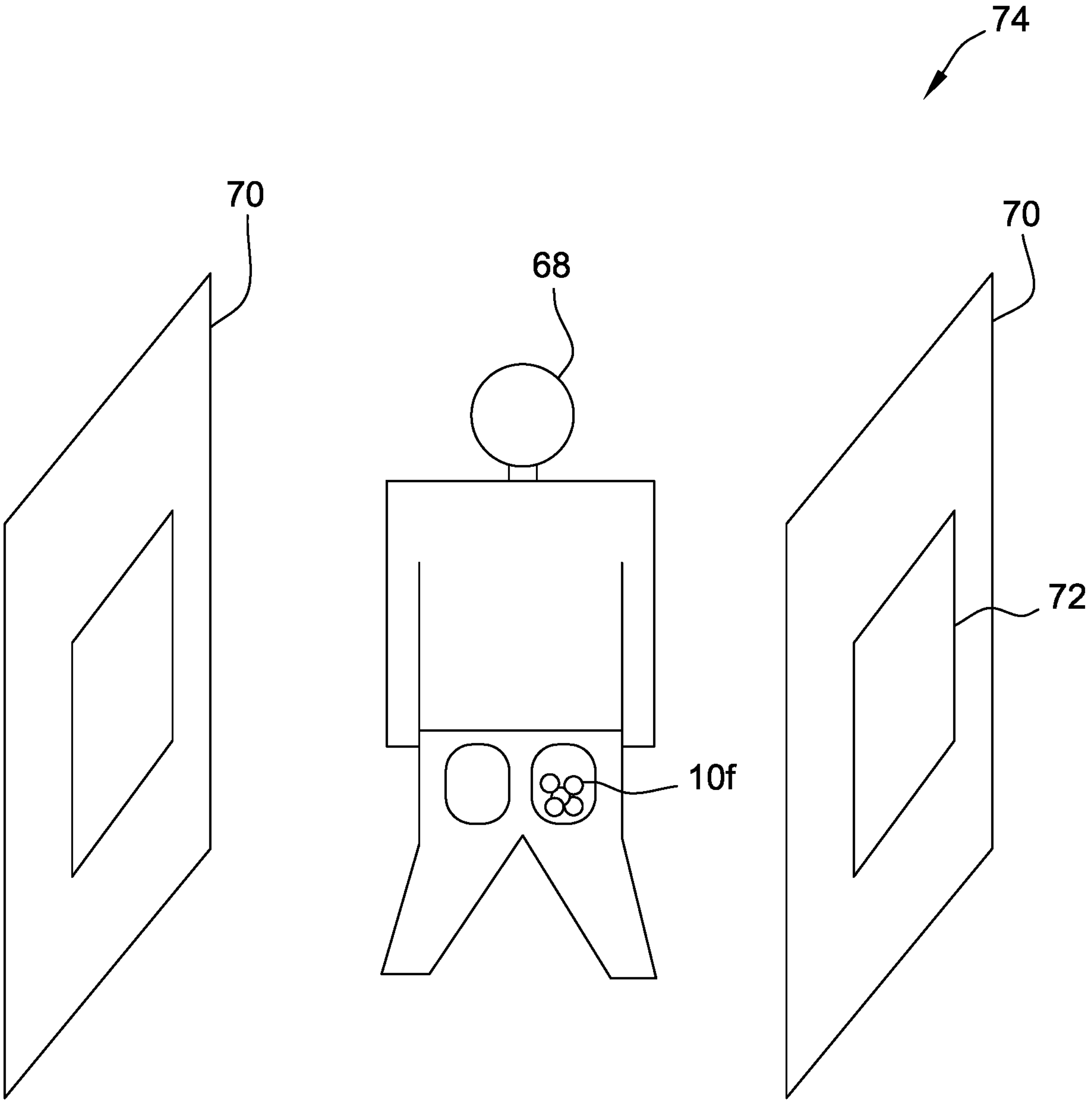
FIG. 9 is a perspective view of a chip monitoring system according to one embodiment of the invention.

FIG. 9 is a perspective view of chip monitor system 74 according to one embodiment of the invention. The chip monitor system 74 includes a chip monitor 72 positioned, for example, at an exit 70 of the casino or gambling establishment. A person of skill in the art should recognize, however, that the chip monitor may also be position at other locations within the casino and is not limited to exits.

According to one embodiment of the invention, the chip monitor includes a processor and a wireless interrogator which specifies a particular interrogation area such that if a player 68 enters the interrogation area with active programmable chips, the player is assumed to be leaving the establishment. In this scenario, the interrogator interrogates the gaming chips 10*f* to retrieve the values stored in the chips, credit the player's account with the value, and deactivates the chips.

Figure 10A:
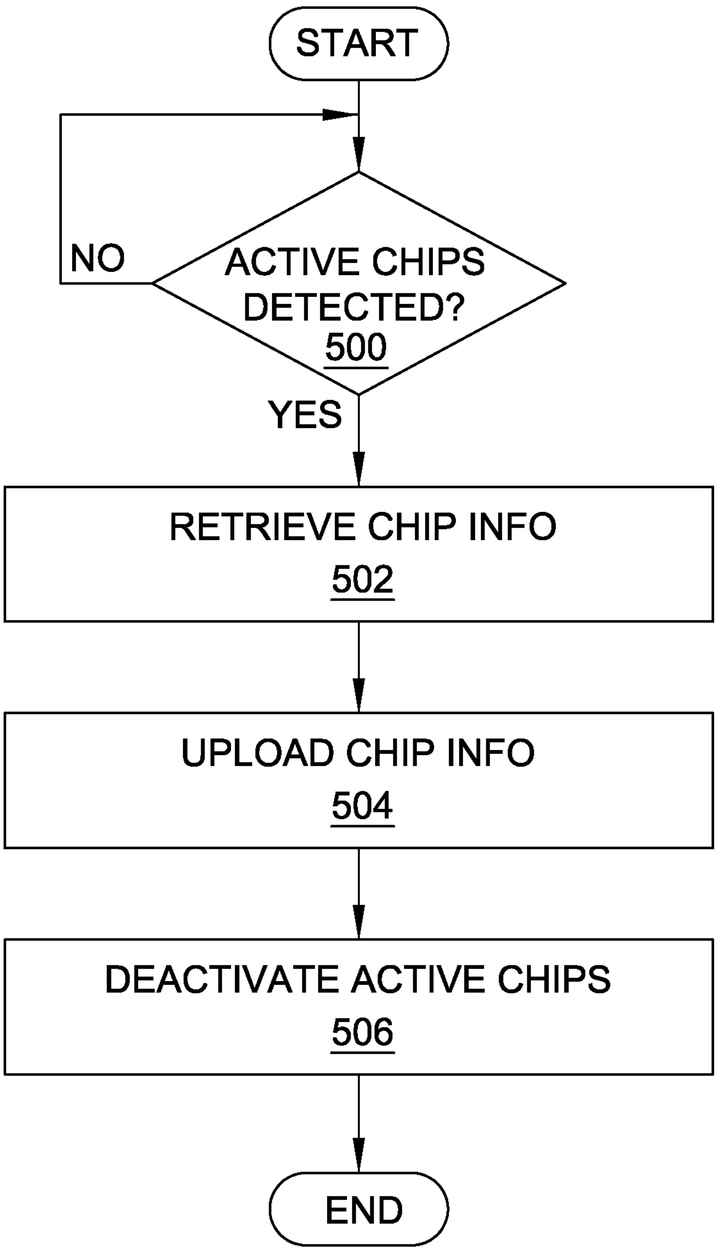
FIG. 10A is a flow diagram of a process executed by a chip monitor for monitoring and deactivating chips according to one embodiment of the invention.

FIG. 10A is a flow diagram of a process executed by the chip monitor 72 for monitoring and deactivating chips according to one embodiment of the invention. The process may be described in terms of a software routine stored in memory and executed by the processor included in the chip monitor. A person of skill in the art should recognize, however, that the routine may be executed via hardware (e.g. via an ASIC), firmware, or in any combination of software, firmware, and/or hardware. Furthermore, the steps of the process may be executed in the indicated order or in any other order recognized by a person of skill in the art.

In step 500 the chip monitor 72 determines whether any active chips have been detected within its interrogation area. An active chip is configured to respond to an interrogation signal issued by the interrogator included in the chip monitor. According to one embodiment of the invention, the active chip responds by transmitting its unique identifier and/or the identifier of the player associated with the chip.

In step 504, the chip information is retrieved, and all or a portion of the chip information is uploaded to the player record in the central storage device 18. Specifically, the chip value is retrieved and uploaded to the player record for crediting the player's account with the uploaded value.

In step 506, the chip is deactivated. According to one embodiment of the invention, the chip monitor 72 may issue a power down command for deactivating the chips.

Figure 10B:
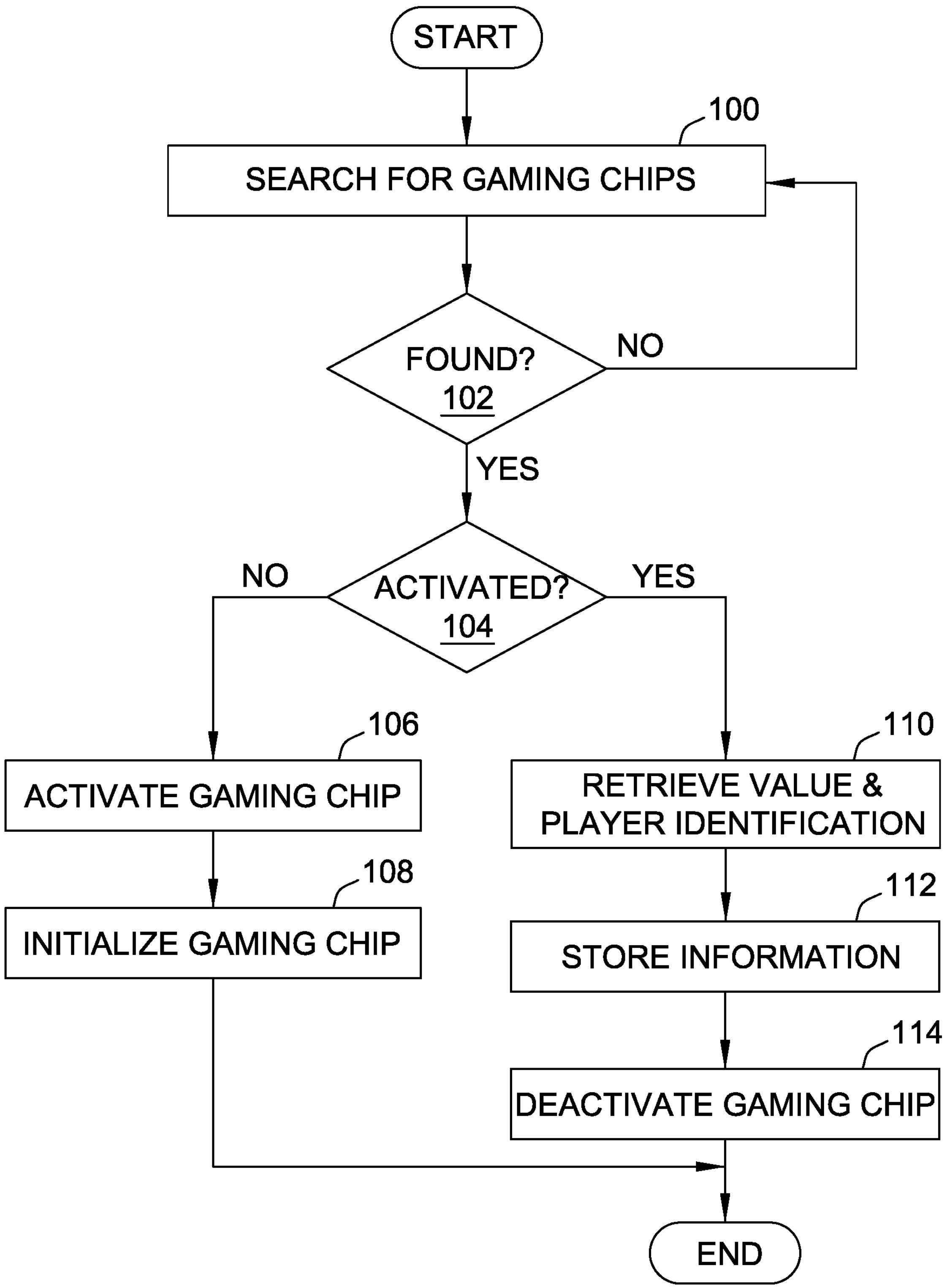
FIG. 10B is a flow diagram of a process executed by a chip monitor for monitoring and activating/deactivating chips according to another embodiment of the invention.

FIG. 10B is a flow diagram of a process executed by the chip monitor 72 for monitoring and deactivating/activating chips according to another embodiment of the invention. This embodiment assumes that a chip will be deactivated and value uploaded to the player's account when leaving the casino, but the chip may be reactivated and value reloaded to the chip when it reenters the casino.

In step 100, the chip monitor searches for programmable gaming chips in the interrogation area. If a programmable gaming chip is found, as determined in step 102, then the chip monitor determines, in step 103, whether the detected chip is active.

If the detected programmable gaming chip is not active, an assumption is made that the chip is returning to the casino after being deactivated. The chip monitor thus activates the programmable gaming chip in step 106, and initializes it in step 108 with the value from the player's account and other information such as, for example, the player's identification information.

If however, the detected programmable gaming chip is active, an assumption is made that the chip is leaving the casino. Thus, steps 110, 112, and 114 are executed for respectively retrieving the chip information, uploading the information, and deactivating the chip as was discussed with respect to steps 502-506 of FIG. 10B.

According to one embodiment of the invention, the chip monitor is only a proxy device, and the tasks performed in the flow diagram of FIGS. 10A-10B are directed by the central server.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A server for configuring a plurality of gaming devices in a gaming establishment, the server comprising:

- a memory device storing a plurality of configuration trigger conditions;
- a processor configured to execute instructions stored in the memory device, which when executed, cause the processor to at least:
  - determine that a configuration trigger condition of the plurality of configuration trigger conditions is satisfied;
  - determine, based at least in part upon the configuration trigger condition, a configuration parameter for a respective configurable element of each gaming device of the plurality of gaming devices, wherein each respective configurable element comprises:
    - a front display panel coupled to a housing of the gaming device; and
    - at least one side display panel coupled to the housing of the gaming device, the front display panel and the at least one side display panel of each gaming device of the plurality of gaming devices comprising a plurality of display panels, each gaming device of the plurality of gaming devices further comprising a respective game display different from the plurality of display panels and configured to display game outcomes; and
  - in response to determining the configuration parameter, control the plurality of display panels to change display from an initial display pattern to a configuration display pattern for a predetermined period of time by transmitting a configuration command to the plurality of gaming devices, wherein each respective gaming device of the plurality of gaming devices is programmed to:
    - cause display of the initial display pattern on respective display panels of the respective gaming device;
    - receive the configuration command;
    - based on the configuration command:
      - cause display of a configuration background on the respective game display of the respective gaming device, wherein the configuration background comprises a first shade;
      - identify a second shade for the configuration display pattern, wherein the second shade is identified based on the first shade and is different from the first shade to enhance display of the configuration background comprising the first shade; and cause display of the configuration display pattern on the respective display panels for the predetermined period of time, wherein the configuration display pattern is associated with the configuration background on the respective game display and comprises the second shade; and revert to causing display of the initial display pattern on the respective display panels after the predetermined period of time has passed.

2. The server of claim 1, wherein at least one gaming device of the plurality of gaming devices is a gaming terminal, and the respective configurable element further includes a physical component of the gaming terminal.

3. The server of claim 1, wherein the instructions, when executed, further cause the processor to at least:

determine, based upon device utilization data received from the plurality of gaming devices, the device utilization data indicating whether each gaming device of the plurality of gaming devices is player-occupied, a first subset of the plurality of gaming devices that are player-occupied, the first subset presenting a first wagering game;

determine, based upon the device utilization data, a second subset of the plurality of gaming devices that are not player occupied, the second subset presenting a wagering game different from the first wagering game;

determine, based upon a number of gaming devices included in the second subset, that the configuration trigger is satisfied; and in response to the configuration trigger being satisfied, transmit the configuration command to the second subset of the plurality of gaming devices that are not player occupied, wherein the configuration command causes the second subset of the plurality of gaming devices to transition from presentation of a second wagering game to the first wagering game.

4. The server of claim 1, wherein the configuration trigger is one of a pre-configured date on a calendar or pre-configured time on the calendar, and wherein the instructions, when executed, further cause the processor to at least transmit the configuration command to the plurality of gaming devices at least one of on the pre-configured date on the calendar or during the pre-configured time on the calendar, wherein one or more of the pre-configured date on the calendar or during the pre-configured time on the calendar comprises a holiday.

5. The server of claim 1, wherein the instructions, when executed, further cause the processor to at least:

receive data from the plurality of gaming devices indicating whether any gaming device of the plurality of gaming devices has been awarded a jackpot award; and in response to receiving data indicating that at least one gaming device of the plurality of gaming devices has been awarded a jackpot award, i) determine that the configuration command is satisfied, and ii) transmit the configuration command one of a) to the at least one gaming device, or b) to the plurality of gaming devices.

6. The server of claim 1, wherein the respective configurable element further includes one of a seat, a button, a rear panel, and an audio output device.

7. The server of claim 1, wherein the plurality of display panels comprise electronic display panels.

8. A method for configuring a plurality of gaming devices in a gaming establishment, the method comprising at least:

determining, by a processor of a server system communicatively coupled to the plurality of gaming devices, that a configuration trigger condition of a plurality of configuration trigger conditions is satisfied;

determining, by the processor and based at least in part upon the configuration trigger condition, a configuration parameter for a respective configurable element of each gaming device of the plurality of gaming devices, wherein each respective configurable element comprises:

a front display panel coupled to a housing of the gaming device; and at least one side display panel coupled to the housing of the gaming device, the front display panel and the at least one side display panel of each gaming device of the plurality of gaming devices comprising a plurality of display panels, each gaming device of the plurality of gaming devices further comprising a respective game display different from the plurality of display panels and configured to display game outcomes; and in response to determining the configuration parameter, controlling, by the processor, the plurality of display panels to change display from an initial display pattern to a configuration display pattern for a predetermined period of time by transmitting a configuration command to the plurality of gaming devices wherein each respective gaming device of the plurality of gaming devices is programmed to:

cause display of the initial display pattern on respective display panels of the respective gaming device;

receive the configuration command;

based on the configuration command:

cause display of a configuration background on the respective game display of the respective gaming device, wherein the configuration background comprises a first shade;

select a second shade for the configuration display pattern, wherein the second shade is selected based on the first shade and is different from the first shade to enhance display of the configuration background comprising the first shade; and cause display of the configuration display pattern on the respective display panels for the predetermined period of time, wherein the configuration display pattern is associated with the configuration background on the respective game display and comprises the second shade; and cause display to be changed to the initial display pattern on the respective display panels after the predetermined period of time has passed.

9. The method of claim 8, further comprising:

determining, by the processor and based upon device utilization data, a first subset of the plurality of gaming devices that are player-occupied, the first subset presenting a first wagering game;

determining, by the processor and based upon the utilization data, a second subset of the plurality of gaming devices that are not player occupied, the second subset presenting a wagering game different from the first wagering game;

determining, by the processor and based upon a number of gaming devices included in the second subset, that the configuration trigger is satisfied; and in response to the configuration trigger being satisfied, transmitting, by the processor, the configuration command to the second subset of the plurality of gaming devices that are not player occupied, wherein the configuration command causes the second subset of the plurality of gaming devices to transition from presentation of a second wagering game to the first wagering game.

10. The method of claim 8, wherein the configuration trigger is one of a pre-configured date on a schedule or pre-configured time on a schedule, the method further comprising, at least, transmitting, by the processor, the configuration command to the plurality of gaming devices at least one of on the pre-configured date on the schedule or during the time on the schedule, wherein one or more of the pre-configured date on the schedule or during the pre-configured time on the schedule comprises a holiday.

11. The method of claim 8, further comprising at least:

receiving, by the processor, data from the plurality of gaming devices indicating whether any gaming device of the plurality of gaming devices has been awarded a jackpot award; and in response to receiving data indicating that at least one gaming device of the plurality of gaming devices has been awarded a jackpot award, i) determining, by the processor, that the configuration command is satisfied, and ii) transmitting, by the processor, the configuration command one of a) to the at least one gaming device, or b) to the plurality of gaming devices.

12. A method for configuring a plurality of gaming devices each having a display device for displaying a game outcome selected by a game controller and a housing comprising a front display panel and at least one side display panel, the front display panel and the at least one side display panel of each gaming device of the plurality of gaming devices comprising a plurality of display panels, the method comprising at least:

providing a configurable feature of each gaming device of the plurality of gaming devices, the configurable feature being independent of the game outcome selected by the game controller and comprising the plurality of display panels;

setting, under control of a configuration controller, a configuration parameter for the configurable feature;

setting, under control of the configuration controller, a configuration command associated with the configuration parameter; and in response to setting the configuration parameter, controlling the plurality of display panels to change display from an initial display pattern to a configuration display pattern for a predetermined period of time by transmitting the configuration command to each gaming device of the plurality of gaming devices, wherein each respective gaming device of the plurality of gaming devices is programmed to:

cause display of the initial display pattern on respective display panels of the respective gaming device receive the configuration command;

based on the configuration command:

cause display of a configuration background on the display device of the respective gaming device, wherein the configuration background comprises a first shade;

select a second shade for the configuration display pattern, wherein the second shade is selected based on the first shade and is different from the first shade to enhance display of the configuration background comprising the first shade; and cause display of the configuration display pattern on the respective display panels for the predetermined period of time, wherein the configuration display pattern is associated with the configuration background on the display device and comprises the second shade; and revert to causing display of the initial display pattern on the respective display panels after the predetermined period of time has passed.

13. The method of claim 12, wherein the configurable feature further includes a seat coupled to at least one gaming device of the plurality of gaming devices, and the configuration parameter identifies a position of the seat.

14. The method of claim 12, wherein the configurable feature further includes the display device of at least one gaming device of the plurality of gaming devices, and wherein the configuration parameter identifies a position of the display device.

15. The method of claim 12, wherein the configurable feature further includes a display setting for at least one gaming device of the plurality of gaming devices, the display setting including at least one of size, color, and shape of images.

16. The method of claim 12, where the configuration command is issued based on user profile information of one or more players at at least one gaming device of the plurality of gaming devices.

17. A method for configuring a plurality of gaming devices, each gaming device of the plurality of gaming devices comprising a game display configured to display game outcomes, a front display panel, and at least one side display panel coupled to a housing of the gaming device, the front display panel and the at least one side display panel of each gaming device of the plurality of gaming devices comprising a plurality of display panels, the method comprising:

receiving, by a processor of a gaming device of the plurality of gaming devices, user input from a user;

configuring, by the processor, the gaming device based on the user input;

storing, by the processor, the user input in a user record;

determining, by the processor, that the user is proximate the gaming device;

retrieving, by the processor, the user record based on the determining that the user is proximate the gaming device;

automatically reconfiguring, by the processor, the gaming device based on the user input stored in the user record;

determining, by the processor, that a configuration trigger condition of a plurality of configuration trigger conditions is satisfied;

determining, by the processor, based at least in part upon the configuration trigger condition, a configuration parameter for the display panel of each gaming device of the plurality of gaming devices;

in response to determining the configuration parameter, controlling the plurality of display panels to change display from an initial display pattern to a configuration display pattern for a predetermined period of time by transmitting a configuration command to the plurality of gaming devices, wherein each respective gaming device of the plurality of gaming devices is programmed to:

cause display of the initial display pattern on respective display panels of the respective gaming device;

receive the configuration command;

based on the configuration command:

cause display of a configuration background on a respective game display of the respective gaming device, wherein the configuration background comprises a first shade;

determine a second shade for the configuration display pattern, wherein the second shade is determined based on the first shade and is different from the first shade to enhance display of the configuration background comprising the first shade; and cause display of the configuration display pattern on the respective display panels for the predetermined period of time, wherein the configuration display pattern is associated with the configuration background on the respective game display and comprises the second shade; and revert to causing display of the initial display pattern on the respective display panels after the predetermined period of time has passed.

18. The method of claim 17, wherein the reconfiguring of the gaming device further includes reconfiguring a position of a seat of the gaming device.

19. The method of claim 17, wherein the reconfiguring of the gaming device further includes reconfiguring a position of a display device of the gaming device.

20. The method of claim 17, wherein the reconfiguring of the gaming device further includes reconfiguring a game property of a game provided by the gaming device.

* * * * *